US012811198B2

(12) United States Patent
Nakano et al.

(10) Patent No.: US 12,811,198 B2
(45) Date of Patent: Nov. 24, 2026

(54) SOLID-STATE BATTERY

(71) Applicant: Murata Manufacturing Co., Ltd., Nagaokakyo (JP)

(72) Inventors: Koichi Nakano, Nagaokakyo (JP); Kiyoshi Kumagae, Nagaokayo (JP); Nobuyuki Iwane, Nagaokayo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 809 days.

(21) Appl. No.: 17/831,860

(22) Filed: Jun. 3, 2022

(65) Prior Publication Data

US 2022/0302506 A1 Sep. 22, 2022

Related U.S. Application Data

(63) Continuation of application No. PCT/JP2020/047494, filed on Dec. 18, 2020.

(30) Foreign Application Priority Data

Dec. 19, 2019 (JP) ................................ 2019-229663

(51) Int. Cl.
*H01M 10/0585* (2010.01)
*H01M 50/531* (2021.01)
*H01M 50/548* (2021.01)

(52) U.S. Cl.
CPC ..... *H01M 10/0585* (2013.01); *H01M 50/531* (2021.01); *H01M 50/548* (2021.01)

(58) Field of Classification Search
CPC ........... H01M 10/0585; H01M 50/548; H01M 50/584; H01M 50/585; H01M 50/586; H01M 10/0562
See application file for complete search history.

(56) References Cited

U.S. PATENT DOCUMENTS 12,444,772 B2 10/2025 Nakano
2007/0042265 A1* 2/2007 Tamai .............. H01M 10/0562 264/618

(Continued)

FOREIGN PATENT DOCUMENTS

CN 113632286 A 11/2021
JP 2007080812 A 3/2007

(Continued)

OTHER PUBLICATIONS

WO2018186449 translation (Year: 2018).*
International Search Report in PCT/JP2020/047494, mailed Mar. 23, 2021, 2 pages.

*Primary Examiner* — Allison Bourke
*Assistant Examiner* — Travis L. Martin
(74) *Attorney, Agent, or Firm* — ArentFox Schiff LLP

(57) ABSTRACT

A solid-state battery including a solid-state battery laminate in which a positive electrode layer, a negative electrode layer, and a solid electrolyte layer are laminated with the solid electrolyte layer interposed between the positive electrode layer and the negative electrode layer, and positive and negative external terminals are on side surfaces of the solid-state battery laminate. The positive electrode layer and the negative electrode layer each include an active material portion containing an active material, and a current collector portion having a relatively small active material density with respect to the active material portion and arranged on an edge surface of the active material portion so as to form an edge surface current collecting structure in which a current can be collected using the current collector portion on the edge surface of the active material portion.

19 Claims, 9 Drawing Sheets

(56) References Cited

U.S. PATENT DOCUMENTS

| | | | | |
|---|---|---|---|---|
| 2011/0281160 | A1* | 11/2011 | Doi | H01M 10/0562 429/211 |
| 2013/0136973 | A1* | 5/2013 | Shenoy | H01M 10/0525 429/211 |
| 2014/0106213 | A1* | 4/2014 | Horikawa | H01M 10/058 429/185 |
| 2019/0288267 | A1* | 9/2019 | Kim | H01M 10/0585 |
| 2019/0393505 | A1 | 12/2019 | Suzuki et al. | |
| 2020/0212450 | A1* | 7/2020 | Shimizu | H01M 4/74 |
| 2022/0006127 | A1 | 1/2022 | Nakano | |
| 2022/0077501 | A1* | 3/2022 | Tanaka | H01M 50/54 |

FOREIGN PATENT DOCUMENTS

| | | | |
|---|---|---|---|
| JP | 2014235990 | A | 12/2014 |
| JP | 2015517189 | A | 6/2015 |
| JP | 2016192370 | A | 11/2016 |
| WO | 2018179580 | A1 | 10/2018 |
| WO | WO-2018186449 | A1 * | 10/2018 |
| WO | 2018235398 | A1 | 12/2018 |
| WO | 2019/176940 | A1 | 9/2019 |

* cited by examiner

FIG. 10 - PRIOR ART
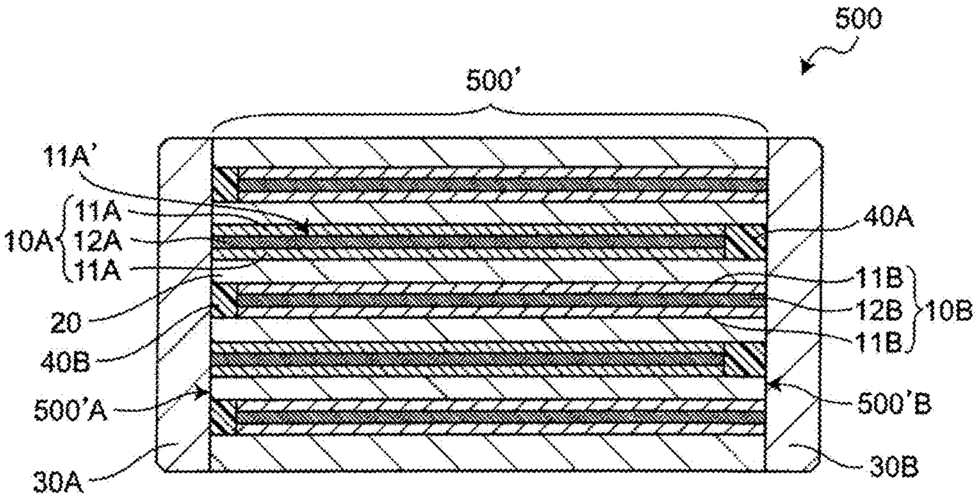

SOLID-STATE BATTERY

CROSS REFERENCE TO RELATED APPLICATIONS

The present application is a continuation of International application No. PCT/JP2020/047494, filed Dec. 18, 2020, which claims priority to Japanese Patent Application No. 2019-229663, filed Dec. 19, 2019, the entire contents of each of which are incorporated herein by reference.

FIELD OF THE INVENTION

The present invention relates to a solid-state battery. More specifically, the present invention relates to a layered solid-state battery.

BACKGROUND OF THE INVENTION

Hitherto, secondary batteries that can be repeatedly charged and discharged have been used for various purposes. For example, secondary batteries are used as power sources of electronic devices such as smartphones and notebooks.

In secondary batteries, a liquid electrolyte is generally used as a medium for ion transfer contributing to charging and discharging. That is, a so-called electrolytic solution is used for secondary batteries. However, in such secondary batteries, safety is generally required in terms of leakage prevention of an electrolytic solution. Since an organic solvent or the like used in an electrolytic solution is a combustible substance, safety is required also in that respect.

Therefore, solid-state batteries using a solid electrolyte instead of an electrolytic solution have been studied.

Patent Document 1: Japanese Patent Application Laid-Open No. 2016-192370

SUMMARY OF THE INVENTION

A solid-state battery includes a solid-state battery laminate including a positive electrode layer, a negative electrode layer, and a solid electrolyte layer between the positive electrode layer and the negative electrode layer (see Patent Document 1). As illustrated in FIG. 10, a solid-state battery laminate 500', a positive electrode layer 10A, a solid electrolyte layer 20, and a negative electrode layer 10B are laminated in this order. In the solid-state battery laminate 500', a positive electrode terminal 30A and a negative electrode terminal 30B are provided so as to be in contact with two facing side surfaces (that is, a positive-electrode-side edge surface 500'A and a negative-electrode-side edge surface 500'B).

In the positive electrode layer 10A, a positive electrode active material portion 11A and a positive electrode current collector portion 12A are adjacent to each other in a lamination direction. In other words, the positive electrode layer 10A has the positive electrode current collector portion 12A (that is, a conductive layer) inside the active material portion or on a main surface of the active material portion. Similarly, in the negative electrode layer 10B, a negative electrode active material portion 11B and a negative electrode current collector portion 12B are adjacent to each other in the lamination direction. In other words, the negative electrode layer 10B has the negative electrode current collector portion 12B (that is, a conductive layer) inside the active material portion or on a main surface of the active material portion.

As illustrated in a sectional view of FIG. 10, the positive electrode layer 10A is in direct contact with the positive electrode terminal 30A and is separated from the negative electrode terminal 30B. Similarly, the negative electrode layer 10B is in direct contact with the negative electrode terminal 30B and is separated from the positive electrode terminal 30A. A positive electrode separation portion 40A and a negative electrode separation portion 40B containing at least an electrical insulating material are interposed between the positive electrode layer 10A and the negative electrode terminal 30B and between the negative electrode layer 10B and the positive electrode terminal 30A, respectively.

The inventors of the present application have noticed that there is still a problem to be overcome in the solid-state battery conventionally proposed as described above and have found a need to take measures therefor. Specifically, the inventors of the present application have found that there are the following problems.

A solid-state battery 500 illustrated in FIG. 10 has a main surface current collecting structure in which a current is collected in an electrode layer (for example, the positive electrode layer 10A) on a main surface (for example, a main surface 11A') of the active material portion (for example, the positive electrode active material portion 11A) of the electrode layer.

In such a main surface current collecting structure, the positive electrode active material portion 11A and the positive electrode current collector portion 12A are adjacent to each other in the lamination direction. With such a configuration, the volume ratio of the active material portion in the solid-state battery can be reduced. Thereby, there is a possibility that the energy density decreases.

In the case of a configuration in which the negative electrode current collector portion 12B contains a negative electrode active material and the positive electrode separation portion 40A not containing an electrode active material is provided between the positive electrode layer 10A and the negative electrode terminal 30B, ions are diffused to a negative electrode region between the negative electrode active material portion 11B and the negative electrode terminal 30B during charging and ions may be difficult to take out ions to take out during discharging.

Similarly, in the case of a configuration in which the positive electrode current collector portion 12A contains a positive electrode active material and the negative electrode separation portion 40B not containing an electrode active material is provided between the negative electrode layer 10B and the positive electrode terminal 30A, excessive ion supply from a positive electrode region between the positive electrode active material portion 11A and the positive electrode terminal 30A may cause a reduction product to be easily deposited.

As described above, when there is a region where the existing portion and the non-existing portion of the electrode active material in the lamination direction and the region is large, there is a possibility that a decrease in energy density and/or non-uniformity of charge-discharge reaction are caused.

The present invention has been made in view of such problems. That is, a main object of the present invention is to provide a more suitable solid-state battery in terms of energy density and uniformity of charge-discharge reaction.

The inventors of the present application have made an attempt to solve the above problems not by follow-on approach to the prior art but new direction approach. As a result, the inventors have reached the invention of a solid-state battery in which the above main object has been achieved.

In the present invention, there is provided a solid-state battery, including: a solid-state battery laminate in which a positive electrode layer, a negative electrode layer, and a solid electrolyte layer are laminated with the solid electrolyte layer interposed between the positive electrode layer and the negative electrode layer; a positive electrode external terminal on a first side surface of the solid-state battery laminate and electrically connected to the positive electrode layer; and a negative electrode terminal on a second side surface of the solid-state battery laminate and electrically connected to the negative electrode layer, wherein the positive electrode layer and the negative electrode layer each include: an active material portion containing an active material, and a current collector portion having a relatively small active material density with respect to the active material portion and arranged on an edge surface of the active material portion so as to form an edge surface current collecting structure in which a current can be collected using the current collector portion provided on the edge surface of the active material portion.

The solid-state battery according to the present invention is a more suitable solid-state battery in terms of energy density and uniformity of charge-discharge reaction.

More specifically, in the solid-state battery of the present invention, the electrode layer has an edge surface current collecting structure in which a current is collected using the current collector portion provided on the edge surface of the active material portion. Therefore, the volume ratio of the active material portion in the solid-state battery can be further increased. Thus, the energy density of the battery can be further increased.

In the solid-state battery of the present invention, since the current collector portion has a relatively small active material density with respect to the active material portion in the electrode layer, it is possible to suppress diffusion of ions and excessive ion supply in a region where the existing portion and the non-existing portion of the electrode active material face each other. Therefore, the reaction uniformity in the electrode layer in charging and discharging can be further enhanced.

BRIEF EXPLANATION OF THE DRAWINGS

FIG. 10 is a schematic sectional view illustrating a conventional solid-state battery.

DETAILED DESCRIPTION OF THE INVENTION

Figure 1:
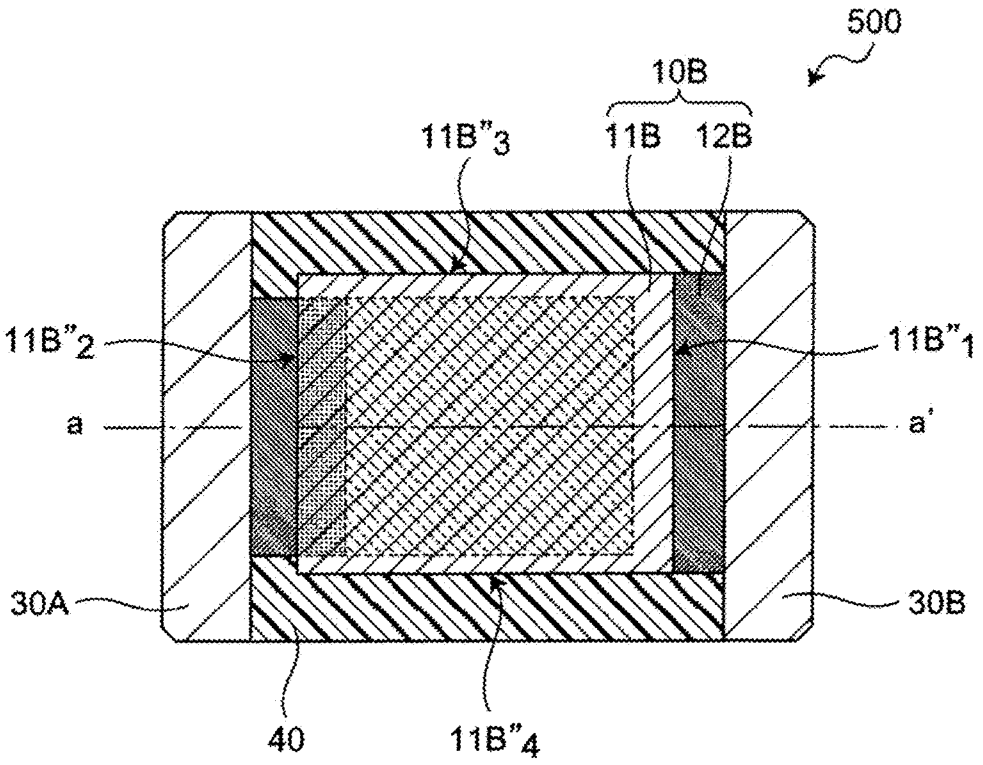
FIG. 1 is a schematic perspective plan view illustrating a solid-state battery according to an embodiment of the present invention.

Hereinafter, a "solid-state battery" of the present invention will be described in detail. Although the description will be given with reference to the drawings as necessary, the illustrated contents are only schematically and exemplarily illustrated to facilitate understanding of the present invention, and appearance and/or dimensional ratio, and the like may be different from actual ones. For explanatory convenience, unless otherwise specified, the same reference numerals or symbols indicate the same members or parts or the same meaning contents.

The term "solid-state battery" described in the present invention refers to a battery whose constituent elements are configured from a solid in a broad sense, and refers to an all-solid-state battery whose constituent elements (particularly preferably all constituent elements) are configured from a solid in a narrow sense. In a preferred embodiment, the solid-state battery in the present invention is a layered solid-state battery configured such that respective layers constituting battery constituent units are laminated with each other, and such respective layers are preferably made of a sintered body.

The "solid-state battery" includes not only a so-called "secondary battery" capable of repeatedly being charged and discharged, but also a "primary battery" capable of only being discharged. According to a preferred embodiment of the present invention, the "solid-state battery" is a secondary battery. The "secondary battery" is not excessively limited by its name, and may include, for example, an electrochemical device such as a "power storage device".

The term "plan view" described herein is based on a sketch drawing when an object is captured from the upper side or the lower side along a thickness direction based on a lamination direction of respective layers constituting the solid-state battery. In short, the term "plan view" is based on a form of the flat surface of the solid-state battery illustrated in FIG. 1 and the like.

The term "sectional view" described herein is based on a form in which the solid-state battery is captured from a direction substantially perpendicular to the thickness direction based on the lamination direction of respective layers constituting the solid-state battery (in other words, a form when the solid-state battery is captured by being cut with a plane parallel to the lamination direction). In short, the term "sectional view" is based on a form of the section of the solid-state battery illustrated in FIG. 2 and the like.

The terms "vertical direction" and "horizontal direction" directly or indirectly used herein correspond to the vertical direction and the horizontal direction in the drawings, respectively. In a preferred embodiment, it can be understood that the downward direction in the vertical direction (that is, a direction in which gravity acts) corresponds to the "downward direction", and the opposite direction corresponds to the "upward direction".

The term "active material density" described herein substantially means a value obtained by dividing an amount (for example, mass) of the active material distributed in a space or a surface of the active material portion or the current collector portion in the electrode layer by the volume or area of the electrode layer. In other words, the term "active material density" described herein substantially means the "content of the active material" in the active material portion or the current collector portion.

The expression "current collector portion having a relatively small active material density" also includes an embodiment in which the current collector portion does not contain an active material with respect to the electrode layer.

[Configuration of Solid-State Battery According to Present Invention]

The solid-state battery includes a solid-state battery laminate including at least one battery constituent unit along the lamination direction in which a positive electrode layer, a negative electrode layer, and a solid-state battery laminate are laminated with the solid electrolyte layer interposed therebetween.

The solid-state battery may be formed by firing respective layers constituting the solid-state battery, and the positive electrode layer, the negative electrode layer, the solid electrolyte layer, and the like may form a sintered layer. Preferably, the positive electrode layer, the negative electrode layer, and the solid electrolyte are fired integrally with each other.

The positive electrode layer includes at least a positive electrode active material portion containing a positive electrode active material and a positive electrode current collector portion having a relatively small positive electrode active material density with respect to the positive electrode active material portion. In a preferred embodiment, the positive electrode layer is configured by a fired body including at least the positive electrode active material portion and the positive electrode current collector portion.

Similarly, the negative electrode layer includes at least a negative electrode active material portion containing a negative electrode active material and a negative electrode current collector portion having a relatively small negative electrode active material density with respect to the negative electrode active material portion. In a preferred embodiment, the negative electrode layer is configured by a fired body including at least the negative electrode active material portion and the negative electrode current collector portion.

The positive electrode active material and the negative electrode active material are materials involved in transmission and reception of electrons in the solid-state battery. Movement (or conduction) of ions between the positive electrode layer and the negative electrode layer through the solid electrolyte and transmission and reception of electrons between the positive electrode layer and the negative electrode layer through the external terminal are performed, whereby charging and discharging are performed.

Each of the electrode layers of the positive electrode layer and the negative electrode layer is preferably a layer capable of occluding and releasing lithium ions or sodium ions. That is, the battery according to the present invention is preferably an all-solid-state secondary battery in which lithium ions or sodium ions move between the positive electrode layer and the negative electrode layer through the solid electrolyte to charge and discharge the battery.

(Positive Electrode Active Material Portion)

The positive electrode active material contained in the positive electrode active material portion is, for example, a lithium-containing compound. The kind of the lithium-containing compound is not particularly limited, and is, for example, a lithium transition metal composite oxide and/or a lithium transition metal phosphate compound. The lithium transition metal composite oxide is a generic term for oxides containing lithium and one or two or more kinds of transition metal elements as constituent elements. The lithium transition metal phosphate compound is a generic term for phosphate compounds containing lithium and one or two or more kinds of transition metal elements as constituent elements. The kind of the transition metal element is not particularly limited, and examples thereof include cobalt (Co), nickel (Ni), manganese (Mn), and/or iron (Fe).

The lithium transition metal composite oxide is, for example, a compound represented by each of $Li_xM1O_2$ and $Li_yM2O_4$, or the like. The lithium transition metal phosphate compound is, for example, a compound represented by $Li_zM3PO_4$, or the like. However, each of M1, M2, and M3 is one or two or more kinds of transition metal elements. Each value of x, y, and z is arbitrary.

Specifically, examples of the lithium transition metal composite oxide include $LiCoO_2$, $LiNiO_2$, $LiVO_2$, $LiCrO_2$, $LiMn_2O_4$, $LiCo_{1/3}Ni_{1/3}Mn_{1/3}O_2$, and $LiNi_{0.5}Mn_{1.5}O_4$. Examples of the lithium transition metal phosphate compound include $LiFePO_4$, $LiCoPO_4$, and $LiMnPO_4$. The lithium transition metal composite oxide (particularly, $LiCoO_2$) may contain a trace amount (about several %) of an additive element. Examples of the additive element include one or more elements selected from the group consisting of aluminum (Al), magnesium (Mg), nickel (Ni), manganese (Mn), titanium (Ti), boron (B), vanadium (V), chromium (Cr), iron (Fe), copper (Cu), zinc (Zn), molybdenum (Mo), tin (Sn), tungsten (W), zirconium (Zr), yttrium (Y), niobium (Nb), calcium (Ca), strontium (Sr), bismuth (Bi), sodium (Na), potassium (K), and silicon (Si).

Examples of the positive electrode active material capable of occluding and releasing lithium ions include at least one selected from the group consisting of a sodium-containing phosphate compound having a NASICON-type structure, a sodium-containing phosphate compound having an olivine-type structure, a sodium-containing layered oxide, a sodium-containing oxide having a spinel-type structure, and the like.

The content of the positive electrode active material in the positive electrode active material portion is usually 50 wt % or more, for example, 60 wt % or more with respect to the total amount of the positive electrode active material portion. The positive electrode active material portion may contain two or more kinds of positive electrode active materials, and in this case, the total content thereof may be within the above range. When the content of the active material is 50 mass % or more, the energy density of the battery can be particularly increased.

(Negative Electrode Active Material Portion)

Examples of the negative electrode active material contained in the negative electrode active material portion include a carbon material, a metal-based material, a lithium alloy, and/or a lithium-containing compound.

Specifically, examples of the carbon material include graphite, graphitizable carbon, non-graphitizable carbon, mesocarbon microbeads (MCMB) and/or highly oriented graphite (HOPG).

The metal-based material is a generic term for materials containing any one or two or more kinds among metal elements and metalloid elements capable of forming an alloy with lithium as constituent elements. This metal-based material may be a simple substance, an alloy, or a compound. Since the purity of the simple substance described here is not necessarily limited to 100%, the simple substance may contain a trace amount of impurities.

Examples of the metal elements and metalloid elements include silicon (Si), tin (Sn), aluminum (Al), indium (In), magnesium (Mg), boron (B), gallium (Ga), germanium (Ge), lead (Pb), bismuth (Bi), cadmium (Cd), titanium (Ti), chromium (Cr), iron (Fe), niobium (Nb), molybdenum (Mo), silver (Ag), zinc (Zn), hafnium (Hf), zirconium (Zr), yttrium (Y), palladium (Pd), and/or platinum (Pt).

Specifically, examples of the metal-based material include Si, Sn, $SiB_4$, $TiSi_2$, SiC, $Si_3N_4$, $SiO_v$ ($0<v\leq 2$), LiSiO, $SnO_w$ ($0<w\leq 2$), $SnSiO_3$, LiSnO, and/or $Mg_2Sn$.

The lithium-containing compound is, for example, a lithium transition metal composite oxide or the like. The definition of the lithium transition metal composite oxide is as described above. Specifically, examples of the lithium transition metal composite oxide include $Li_3V_2(PO_4)_3$, $Li_3Fe_2(PO_4)_3$, $Li_4Ti_5O_{12}$, $LiTi_2(PO_4)_3$, and/or $LiCuPO_4$.

Examples of the negative electrode active material capable of occluding and releasing sodium ions include at least one selected from the group consisting of a sodium-containing phosphate compound having a NASICON-type structure, a sodium-containing phosphate compound having an olivine-type structure, a sodium-containing oxide having a spinel-type structure, and the like.

The content of the negative electrode active material in the negative electrode active material portion is usually 50 wt % or more, for example, 60 wt % or more with respect to the total amount of the negative electrode active material portion. The negative electrode active material portion may contain two or more kinds of negative electrode active materials, and in this case, the total content thereof may be within the above range. When the content of the active material is 50 mass % or more, the energy density of the battery can be particularly increased.

The positive electrode active material portion and/or the negative electrode active material portion may contain a conductive material. Examples of the conductive material contained in the positive electrode active material portion and/or the negative electrode active material portion include a carbon material and a metal material. Specifically, examples of the carbon material include graphite and carbon nanotube. Examples of the metal material include copper (Cu), magnesium (Mg), titanium (Ti), iron (Fe), cobalt (Co), nickel (Ni), zinc (Zn), aluminum (Al), germanium (Ge), indium (In), gold (Au), platinum (Pt), silver (Ag), and/or palladium (Pd), and may be an alloy of two or more thereof.

The positive electrode active material portion and/or the negative electrode active material portion may contain a binder. The binder is, for example, any one or two or more kinds of synthetic rubber, a polymer material, and the like. Specifically, examples of the synthetic rubber include styrene-butadiene-based rubber, fluorine-based rubber, and/or ethylene propylene diene. Examples of the polymer material include at least one selected from the group consisting of polyvinylidene fluoride, polyimide, and an acrylic resin.

The positive electrode active material portion and/or the negative electrode active material portion may contain a sintering aid. Examples of the sintering aid may include at least one selected from the group consisting of lithium oxide, sodium oxide, potassium oxide, boron oxide, silicon oxide, bismuth oxide, and phosphorus oxide.

The thickness of each of the positive electrode active material portion and the negative electrode active material portion is not particularly limited, and may be each independently, for example, 2 μm to 100 μm, and particularly 5 μm to 50 μm.

(Positive Electrode Current Collector Portion/Negative Electrode Current Collector Portion)

The positive electrode current collector portion and the negative electrode current collector portion contain at least a conductive material having conductivity, and a conductive material having high conductivity is preferably used. The positive electrode current collector portion and the negative electrode current collector portion each have a relatively small active material density with respect to the active material portion in each electrode layer.

The positive electrode current collector portion may use, for example, at least one selected from the group consisting of a carbon material, silver, palladium, gold, platinum, aluminum, copper, nickel lithium transition metal composite oxide, and a lithium transition metal phosphate compound.

The negative electrode current collector portion may use, for example, at least one selected from the group consisting of a carbon material, silver, palladium, gold, platinum, aluminum, copper, and nickel.

Each of the positive electrode current collector portion and the negative electrode current collector portion may have an electrical connection portion for being electrically connected to the outside, and may be configured to be electrically connectable to the terminal. Each of the positive electrode current collector portion and the negative electrode current collector portion may have a foil form, and preferably has an integral sintering form from the viewpoint of improving conductivity by integral sintering and reducing manufacturing cost.

When the positive electrode current collector portion and the negative electrode current collector portion have a fired body form, the positive electrode current collector portion and the negative electrode current collector portion may be configured, for example, by a fired body containing a conductive material, an active material, a solid electrolyte, a binder, and/or a sintering aid. The conductive material contained in the positive electrode current collector portion and the negative electrode current collector portion may be selected, for example, from the same material as the conductive material that may be contained in the positive electrode active material portion and/or the negative electrode active material portion. The solid electrolyte, the binder, and/or the sintering aid contained in the positive electrode current collector portion and the negative electrode current collector portion may be selected, for example, from the same materials as the solid electrolyte, the binder, and/or the sintering aid that may be contained in the positive electrode active material portion and/or the negative electrode active material portion.

The content of the active material in the positive electrode current collector portion and the negative electrode current collector portion is usually 90 wt % or less, for example, 80 wt % or less or 50 wt % or less with respect to the total amount of the current collector portion. The current collector portion may contain two or more kinds of active materials, and in this case, the total content thereof may be within the above range. When the content of the active material is 90 wt % or less, the reaction uniformity in the electrode layer during charging and discharging can be particularly enhanced.

The thickness of each of the positive electrode current collector portion and the negative electrode current collector portion is not particularly limited, and may be each independently, for example, 1 μm to 100 μm, and particularly 1 μm to 50 μm.

(Solid Electrolyte Layer)

The solid electrolyte constituting the solid electrolyte layer is a material capable of conducting lithium ions or sodium ions. In particular, the solid electrolyte forming the battery constituent unit in the solid-state battery forms a layer capable of conducting lithium ions or sodium ions between the positive electrode layer and the negative electrode layer. The solid electrolyte may be provided at least between the positive electrode layer and the negative electrode layer. That is, the solid electrolyte may also exist around the positive electrode layer and/or the negative electrode layer so as to protrude from between the positive electrode layer and the negative electrode layer. Specific examples of the solid electrolyte include any one or two or more kinds of a crystalline solid electrolyte, a glass-based solid electrolyte, a glass ceramic-based solid electrolyte, and the like.

Examples of the crystalline solid electrolyte include an oxide-based crystal material and a sulfide-based crystal material. Examples of the oxide-based crystal material include $Li_xM_y(PO_4)_3$ having a NASICON structure ($1 \leq x \leq 2$, $1 \leq y \leq 2$, and M is at least one selected from the group consisting of Ti, Ge, Al, Ga, and Zr, for example, $Li_{1.3}Al_{0.3}Ti_{1.7}(PO_4)_3$), $La_{0.51}Li_{0.34}TiO_{2.94}$ having a perovskite structure, and $Li_7La_3Zr_2O_{12}$ having a garnet structure. Examples of the sulfide-based crystal material include $Li_{3.25}Ge_{0.25}P_{0.75}S_4$ and $Li_{10}GeP_2S_{12}$. The crystalline solid electrolyte may contain a polymer material (for example, polyethylene oxide (PEO) or the like).

Examples of the glass-based solid electrolyte include an oxide-based glass material and a sulfide-based glass material. Examples of the oxide-based glass material include $50Li_4SiO_4 \cdot 50Li_3BO_3$. Examples of the sulfide-based glass material include $30Li_2S \cdot 26B_2S_3 \cdot 44LiI$, $63Li_2S \cdot 36SiS_2 \cdot 1Li_3PO_4$, $57Li_2S \cdot 38SiS_2 \cdot 5Li_4SiO_4$, $70Li_2S \cdot 30P_2S_5$, and $50Li_2S \cdot 50GeS_2$.

Examples of the glass ceramic-based solid electrolyte include an oxide-based glass ceramic material and a sulfide-based glass ceramic material. Examples of the oxide-based glass ceramic material include $Li_{1.07}Al_{0.69}Ti_{1.46}(PO_4)_3$ and $Li_{1.5}Al_{0.5}Ge_{1.5}(PO_4)$ Examples of the sulfide-based glass ceramic material include $Li_7P_3S_{11}$ and $Li_{3.25}P_{0.95}S_4$.

When more emphasis is given on the viewpoint of excellent atmospheric stability and easy integral sintering, the solid electrolyte may contain at least one selected from the group consisting of an oxide-based crystal material, an oxide-based glass material, and oxide-based glass ceramic material.

Examples of the solid electrolyte capable of conducting sodium ions include a sodium-containing phosphate compound having a NASICON structure, an oxide having a perovskite structure, and an oxide having a garnet-type or pseudo-garnet-type structure. Examples of the sodium-containing phosphate compound having a NASICON structure include $Na_xM_y(PO_4)_3$ ($1 \leq x \leq 2$, $1 \leq y \leq 2$, and M is at least one selected from the group consisting of Ti, Ge, Al, Ga, and Zr).

The solid electrolyte layer may contain a binder and/or a sintering aid. The binder and/or the sintering aid contained in the solid electrolyte layer may be selected, for example, from the same materials as the binder and/or the sintering aid that may be contained in the positive electrode active material portion and/or the negative electrode active material portion.

The thickness of the solid electrolyte layer is not particularly limited, and may be, for example, 1 μm to 15 μm, and particularly 1 μm to 5 μm.

(Electrode Separation Portion)

The electrode separation portion (also referred to as "margin portion" or "margin layer") is provided around the positive electrode active material portion, thereby separating such a positive electrode active material portion from the external terminal. And/or, the electrode separation portion is provided around the negative electrode active material portion, thereby separating such a negative electrode active material portion from the external terminal.

For example, the electrode separation portion is provided between the positive electrode active material portion and the negative electrode terminal, thereby separating the positive electrode layer from the negative electrode terminal. The electrode separation portion is provided between the positive electrode active material portion and the positive electrode terminal, thereby separating the positive electrode active material portion from the positive electrode terminal.

Similarly, for example, the electrode separation portion is provided between the negative electrode active material portion and the positive electrode terminal, thereby separating the negative electrode layer from the positive electrode terminal. The electrode separation portion is provided between the negative electrode active material portion and the negative electrode terminal, thereby separating the negative electrode active material portion from the negative electrode terminal.

The electrode separation portion may be made of at least a material (insulating material) that does not allow electricity to pass therethrough. The electrode separation portion may be a space portion. In the case of the electrode separation portion made of a material that does not allow electricity to pass therethrough, the electrode separation portion is preferably made of a material that does not allow electricity and ions (for example, lithium ions) to pass therethrough. For example, the electrode separation portion is not particularly limited, and may be made of a glass material, a ceramic material, and/or a resin material.

The glass material constituting the electrode separation portion is not particularly limited, and examples thereof may include at least one selected from the group consisting of soda lime glass, potash glass, borate-based glass, borosilicate-based glass, barium borosilicate-based glass, zinc borate-based glass, barium borate-based glass, bismuth borosilicate-based glass, bismuth zinc borate-based glass, bismuth silicate-based glass, phosphate-based glass, aluminophosphate-based glass, and zinc phosphate-based glass.

The ceramic material constituting the electrode separation portion is not particularly limited, and examples thereof may include at least one selected from the group consisting of aluminum oxide ($Al_2O_3$), boron nitride (BN), silicon dioxide ($SiO_2$), silicon nitride ($Si_3N_4$), zirconium oxide ($ZrO_2$), aluminum nitride (AlN), silicon carbide (SiC), and barium titanate ($BaTiO_3$).

(Protective Layer)

The protective layer may be formed on the outermost side of the solid-state battery as necessary, and may be provided for electrical, physical, and/or chemical protection. The material constituting the protective layer is preferably excellent in insulation property, durability, and/or moisture resistance and environmentally safe. For example, it is preferable to use glass, ceramics, a thermosetting resin, and/or a photocurable resin.

The protective layer may contain a binder and/or a sintering aid. The binder and/or the sintering aid contained in the protective layer may be selected, for example, from the same materials as the binder and/or the sintering aid that may be contained in the positive electrode active material portion and/or the negative electrode active material portion.

(Terminal)

The solid-state battery is generally provided with a terminal (particularly, an external terminal). In particular, a pair of terminals of the positive and negative electrodes are provided on side surfaces of the solid-state battery. More specifically, the terminal on the positive electrode side connected to the positive electrode layer and the terminal on the negative electrode side connected to the negative electrode layer are provided so as to form a pair. As such a terminal, it is preferable to use a material having high conductivity. Although not particularly limited, the terminal may contain at least one selected from the group consisting of silver, gold, platinum, aluminum, copper, tin, and nickel.

The terminal may contain a binder and/or a sintering aid. The binder and/or the sintering aid contained in the terminal may be selected, for example, from the same materials as the binder and/or the sintering aid that may be contained in the positive electrode active material portion and/or the negative electrode active material portion.

[Features of Solid-State Battery According to Present Invention]

The present invention relates to a solid-state battery including a solid-state battery laminate in which a positive electrode layer, a negative electrode layer, and a solid electrolyte layer are laminated with the solid electrolyte layer interposed therebetween and has a feature in a configuration of the electrode layers (that is, the positive electrode layer and the negative electrode layer).

Specifically, the electrode layer in the solid-state battery of the present invention includes an active material portion containing an active material with respect to the electrode layer and a current collector portion having a relatively small active material density with respect to the active material portion. The electrode layer has an edge surface current collecting structure in which a current is collected using the current collector portion provided on the edge surface of the active material portion. That is, the positive electrode layer of the solid-state battery laminate according to a preferred embodiment includes a positive electrode active material portion containing a positive electrode active material and a current collector portion having a relatively small positive electrode active material density with respect to the positive electrode active material portion, and the current collector portion is provided on the edge surface of the positive electrode active material portion. On the other hand, the negative electrode layer of the solid-state battery laminate according to a preferred embodiment includes a negative electrode active material portion containing a negative electrode active material and a current collector portion having a relatively small negative electrode active material density with respect to the negative electrode active material portion, and the current collector portion is provided on the edge surface of the negative electrode active material portion.

Hereinafter, while an embodiment focusing on the negative electrode layer may be described, the same features can also be provided in the positive electrode layer. Conversely, while an embodiment focusing on the positive electrode layer may be described, the same features can also be provided in the negative electrode layer.

The term "edge surface" described herein refers to a surface parallel to an electrode lamination direction. The term "parallel" described herein includes not only perfect parallel but also "substantially parallel", and means that an embodiment in which members are slightly shifted from each other (for example, an embodiment in which an angle between the plane direction/extending direction in the "edge surface" and the electrode lamination direction is about 0° to 10° may be employed. The "edge surface of the active material portion" refers to, for example, a surface constituting an outer edge of the active material portion in a plan view of the solid-state battery. In an exemplary embodiment illustrated in FIG. 1, in a plan view of the solid-state battery 500, edge surfaces of the negative electrode active material portion 11B refer to surfaces 11B"$_1$ to 11B"$_4$ constituting the outer edge of the negative electrode active material portion 11B.

The term "main surface" described herein refers to a surface having a normal line in the electrode lamination direction. In an exemplary embodiment illustrated in FIG. 2, main surfaces of the negative electrode active material portion 11B refer to surfaces 11B'$_1$ and 11B'$_2$ having a normal line in the lamination direction in the negative electrode active material portion 11B.

The term "edge surface current collecting structure" described herein refers to a structure in which electrons enter and exit from the edge surface of the active material portion in the electrode layer. More specifically, the edge surface current collecting structure refers to a structure in which transmission and reception of electrons between the active material portion and the external terminal through the current collector portion provided on the edge surface of the active material portion in the electrode layer are performed.

Preferably, in the electrode layer having an edge surface current collecting structure, the active material portion and the current collector portion are juxtaposed to each other in a direction orthogonal to the electrode lamination direction, and the current collector portion is in contact with each of the active material portion and the external terminal. The electrode layer is electrically connected to the external terminal through the current collector portion in the electrode layer. The active material portion may not be in contact with the external terminal, and is preferably not in direct contact with the external terminal (particularly, the external terminal having the same polarity). In the edge surface current collecting structure, the current collector portion is interposed between the active material portion and the external terminal such that one of the edge surfaces of the current collector portions is in contact with the active material portion and the other of the edge surfaces of the current collector portions is in contact with the external terminal. In the sectional view as illustrated in FIG. 2, the current collector portion is not provided inside the active material portion and the upper and lower surfaces (that is, the main surface having a normal line in the electrode lamination direction), but the current collector portion is provided outside the active material portion so as to connect the active material portion and the external terminal to each other.

The term "current collector portion" described herein refers to a member that contributes to entrance and exit of electrons from the edge surface of the active material portion in a broad sense. In a narrow sense, the term "current collector portion" is a conductive member provided separately from the active material portion from the viewpoint of reducing the internal resistance and is a conductive member having lower electric resistance than the active material portion.

Figure 2:
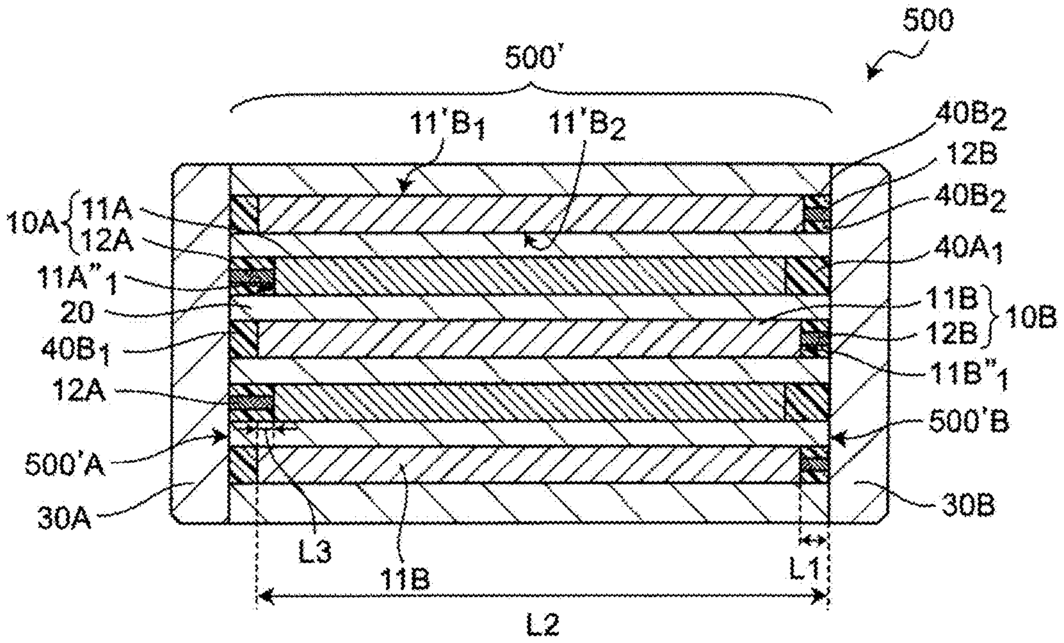
FIG. 2 is a schematic view illustrating an embodiment of a section of the solid-state battery taken along line a-a' in FIG. 1.

In an exemplary embodiment illustrated in FIG. 2, in a sectional view of the solid-state battery laminate 500', the positive electrode layer 10A, the solid electrolyte layer 20, and the negative electrode layer 10B are provided in this order. In the solid-state battery laminate 500', the positive electrode terminal 30A and the negative electrode terminal 30B are provided so as to be in contact with two facing side surfaces (that is, the positive-electrode-side edge surface 500'A and the negative-electrode-side edge surface 500'B).

The positive electrode layer 10A is in direct contact with the positive electrode terminal 30A, and is separated from the negative electrode terminal 30B by the positive electrode separation portion 40A. Similarly, the negative electrode layer 10B is in direct contact with the negative electrode terminal 30B, and is separated from the positive electrode terminal 30A by the negative electrode separation portion 40B.

Here, the positive electrode layer 10A has a structure in which a current is collected by the positive electrode current collector portion 12A provided on an edge surface 11A"$_1$ of the positive electrode active material portion 11A. Similarly, the negative electrode layer 10B has a structure in which a current is collected by the negative electrode current collector portion 12B provided on an edge surface 11B"$_1$ of the negative electrode active material portion 11B.

More specifically, the positive electrode active material portion 11A and the positive electrode current collector portion 12A are juxtaposed to each other in a direction orthogonal to the lamination direction of the solid-state battery laminate 500' in the positive electrode layer 10A, and the positive electrode current collector portion 12A is in contact with each of the positive electrode active material portion 11A and the positive electrode terminal 30A. In other words, the current collector portion of the positive electrode is interposed between the positive electrode active material portion and the positive electrode terminal such that one of the edge surfaces of the current collector portions of the positive electrode is in contact with the positive electrode active material portion and the other of the edge surfaces of the current collector portion of the positive electrode is in contact with the positive electrode terminal.

Similarly, the negative electrode active material portion 11B and the negative electrode current collector portion 12B are juxtaposed to each other in a direction orthogonal to the lamination direction of the solid-state battery laminate 500' in the negative electrode layer 10B, and the negative electrode current collector portion 12B is in contact with each of the negative electrode active material portion 11B and the negative electrode terminal 30B. In other words, the current collector portion of the negative electrode is interposed between the negative electrode active material portion and the negative electrode terminal such that one of the edge surfaces of the current collector portions of the negative electrode is in contact with the negative electrode active material portion and the other of the edge surfaces of the current collector portion of the negative electrode is in contact with the negative electrode terminal.

The electrode layers of the positive electrode layer 10A and the negative electrode layer 10B are electrically connected to the external terminals 30A and 30B via the current collector portions 12A and 12B in the electrode layer, respectively. As illustrated in the sectional view of FIG. 2, it is preferable that the external terminal 30A on the positive electrode side and the external terminal 30B on the negative electrode side are provided on the side surface of the solid-state battery laminate 500' so as to face each other.

The current collector portion is in contact with each of the active material portion and the external terminal having the same polarity on two facing edge surfaces of the current collector portion. The current collector portion may be in contact with each of the active material portion and the external terminal having the same polarity on at least a part of two facing edge surfaces of the current collector portion.

In the solid-state battery of the present invention, one of the positive electrode layer and the negative electrode layer may have the edge surface current collecting structure as described above, and both the positive electrode layer and the negative electrode layer may have the edge surface current collecting structure as described above. That is, in each of the positive electrode layer and the negative electrode layer, current collection is not performed on the main surface of the active material portion of the electrode layer, but current collection may be performed only on the edge surface of the active material portion of the electrode layer. Since a current is collected not on the main surface but the edge surface of the layer formed by the active material portion in this way, the characteristic structure of the present invention can also be referred to as a "structure in which a current is collected from the edge surface of the layer formed by the active material portion", a "structure in which a current is collected not from the main surface and the inside but only from the edge surface of the layer formed by the active material portion", or the like.

More specifically, in the positive electrode layer, current collection is not performed from the main surface of the active material portion (that is, a surface of the positive electrode active material portion having a normal line in the electrode lamination direction in the solid-state battery laminate), but current collection is performed from the edge surface of the active material portion (that is, a terminating edge surface outside the positive electrode active material portion parallel to the electrode lamination direction in the solid-state battery laminate). Similarly, in the negative electrode layer, current collection is not performed from the main surface of the active material portion (that is, a surface of the negative electrode active material portion having a normal line in the electrode lamination direction in the solid-state battery laminate), but current collection is performed from the edge surface of the active material portion (that is, a terminating edge surface outside the negative electrode active material portion parallel to the electrode lamination direction in the solid-state battery laminate).

In the solid-state battery of the present invention, when the active material portion does not include a layer corresponding to a current collector layer inside the active material portion and does not also have a current collector layer in contact with the active material portion to form a laminate, that is, when a current collector portion is not provided inside the active material portion and a current collector portion in contact with the main surface (particularly, most surface thereof) of the active material portion is also not provided in the solid-state battery laminate, a current can be collected.

In this regard, the active material portion of each of the positive electrode layer and the negative electrode layer may be preferably an active material portion without current collecting that does not include a current collector or a current collecting layer inside the active material portion and the main surface thereof. That is, the active material portion may not be provided with a current collector/current collecting layer that is in direct contact with the active material portion to be laminated with the active material portion, and may not be provided with a current collector/current collecting layer that extends in a direction orthogonal to the lamination direction inside the active material portion. In other words, the active material portion of each electrode layer of the positive electrode layer and the negative electrode layer may not have a conductive layer inside the active material portion and the main surface thereof. For example, the active material portion may not have a sublayer mainly including a metal body or a metal sintered body inside the active material portion and the main surface thereof, and thus, such a conductive layer may not be provided in the solid-state battery laminate. As can be seen from such description, the term "conductive layer" is a conductive layer constituting a region that is distinguished from the region of the active material portion, and is preferably a conductive layer exhibiting lower electric resistance than the active material portion. In the sectional view as illustrated in FIG. 2, the active material portion (11A, 11B) may include the active material to form a substantially single region.

By forming the electrode layer having such an edge surface current collecting structure, the volume ratio of the active material portion containing an active material to the electrode layer in the solid-state battery can be further increased than that of the electrode layer having a main surface current collecting structure. Thus, the energy density as the solid-state battery can be further increased.

In the electrode layer, a ratio (L1/L2) of a current collector portion length dimension (L1) to an electrode layer length dimension (L2) is 0.01 to 0.5 (see FIG. 2). When the ratio is set to 0.01 or more, the uniformity of electron transfer can be further enhanced. When the ratio is set to 0.5 or less, the energy density of the battery can be further increased. From the viewpoint of uniformity of electron transfer and energy density, the ratio is preferably 0.01 to 0.4, and is, for example, 0.01 to 0.30 or 0.01 to 0.2.

By forming the electrode layer including an edge surface current collecting structure, a laminating step of the electrode layer (for example, a printing step) can be simplified. Therefore, the manufacturing cost of the solid-state battery can be reduced.

Due to the edge surface current collecting structure, the solid-state battery of the present invention may not include the current collector portion with respect to the main surface of the active material portion. That is, the solid-state battery of the present invention preferably has the current collector portion substantially only on the edge surface of the active material portion. More specifically, the positive electrode layer may have a current collector portion such that most or all of the current collector portion is in contact with not the main surface but the edge surface of the active material portion (that is, the surface constituting the outer edge of the positive electrode active material layer). Similarly, the negative electrode layer may have a current collector portion such that most or all of the current collector portion is in contact with not the main surface but the edge surface of the active material portion (that is, the surface constituting the outer edge of the negative electrode active material layer).

In the solid-state battery of the present invention, at least a pair of electrode layers among the electrode layers of the positive electrode layer and the negative electrode layer adjacent to each other with the solid electrolyte layer interposed therebetween in the electrode lamination direction may have an edge surface current collecting structure. From the viewpoint of energy density and uniformity of charge-discharge reaction, it is preferable that ¼ or more of the pairs of electrode layers adjacent to each other with the solid electrolyte layer interposed therebetween in the lamination direction have the edge surface current collecting structure, and for example, all the pairs have the edge surface current collecting structure.

In the electrode layer, the electrode separation portion (for example, a negative electrode separation portion 40$B_2$) may be interposed between the active material portion (for example, the negative electrode active material portion 11B) and the external terminal having the same polarity as the electrode layer (for example, the negative electrode terminal 30B) (see FIG. 2). By interposing the electrode separation portion between the active material portion and the external terminal having the same polarity, adhesion between the battery constituent members can be further enhanced, and the structural stability of the solid-state battery can be further enhanced. In the negative electrode layer, the negative electrode separation portion 40$B_2$ and the negative electrode current collector portion 12B may be provided to be laminated on each other. As illustrated in the sectional view of FIG. 2, two negative electrode separation portions 40$B_2$ may be provided such that the negative electrode current collector portion 12B is sandwiched by the two negative electrode separation portions 40B. As described above, in the electrode layer having an edge surface current collecting structure, the current collector portion and the electrode separation portion may be provided to be laminated on each other in a region between the active material portion and the external terminal (particularly, the external terminal having the same polarity.

Figure 3:
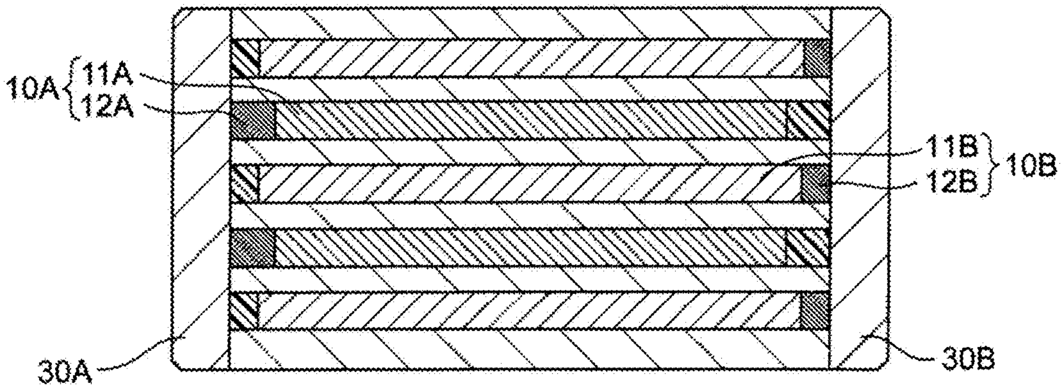
FIG. 3 is a schematic view illustrating another embodiment of the section of the solid-state battery taken along line a-a' in FIG. 1.

In the electrode layer, all the spaces between the active material portion (for example, the negative electrode active material portion 11B) and the external terminal having the same polarity as the electrode layer (for example, the negative electrode terminal 30B) may be configured by the current collector portion (for example, the negative electrode current collector portion 12B) (see FIG. 3).

In other words, in a sectional view of the solid-state battery laminate, the active material portion and the current collector portion may be flush with each other. That is, in the electrode layer having an edge surface current collecting structure, the main surface on the upper side and/or the lower side of the active material portion and the main surface on the upper side and/or the lower side of the current collector portion may be flush with each other. The term "flush" described herein is not limited to a state where there is no level difference between the active material portion and the current collector portion in the sectional view of the solid-state battery laminate, but also includes a state where there is substantially no level difference and allows a level difference of about a dimensional tolerance (for example, a level difference of 5 μm or less) between the active material portion and the current collector portion.

With such a configuration, a contact area between the current collector portion and each of the active material portion and the external terminal can be further increased. That is, in the electrode layer having an edge surface current collecting structure, the contact area between the current collector portion and the active material portion can be further increased, and at the same time, the contact area between the current collector portion and the external terminal can be further increased. Thus, it becomes easy to make the electron transfer uniform and the resistance low, and the current collection efficiency can be further enhanced. Since it is not necessary to form another layer across the current collector portion, the manufacturing process can be particularly simplified.

Figure 4A:
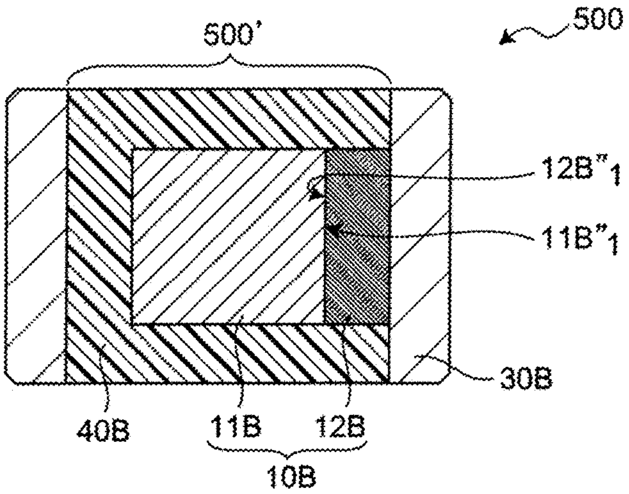
FIGS. 4A to 4C are schematic plan views illustrating an embodiment of an electrode layer in the solid-state battery of the present invention.

In an embodiment, in the plan view of the solid-state battery laminate 500', an edge surface (for example, an edge surface 12$B''_1$) of the negative electrode current collector portion 12B is in contact with substantially the entire surface of an edge surface (for example, an edge surface 11$B''_1$) of the adjacent negative electrode active material portion 11B (see FIG. 4A). That is, in the electrode layer including an edge surface current collecting structure, the entire edge surface positioned particularly on the active material portion side among edge surfaces of the current collector portion may be in contact with the active material portion. With such a configuration, a separation distance between the current collector portion and each point in the active material portion can be further reduced. Thus, it becomes easy to make the electron transfer more uniform, and the current collection efficiency can be further enhanced.

In the solid-state battery according to the present invention, the current collector portion in the electrode layer may have a relatively small active material density with respect to the active material portion. That is, in the electrode layer having an edge surface current collecting structure, the current collector portion may have a smaller active material density than the active material portion adjacent to the current collector portion in a direction orthogonal to the lamination direction. Thereby, it becomes easy to suppress diffusion of ions and excessive ion supply in a region where the existing portion and the non-existing portion of the electrode active material face each other in the lamination direction. Therefore, the reaction uniformity in the electrode layer in charging and discharging can be further enhanced.

In an exemplary embodiment illustrated in FIG. 2, the positive electrode current collector portion 12A in the positive electrode layer 10A has a relatively small positive electrode active material density with respect to the active material portion 11A. Similarly, the negative electrode current collector portion 12B in the negative electrode layer 10B has a relatively small negative electrode active material density with respect to the negative electrode active material portion 11B.

In a preferred embodiment, at least one electrode layer of the positive electrode layer and the negative electrode layer includes the current collector portion not containing an active material with respect to the electrode layer. That is, in the electrode layer including an edge surface current collecting structure, the current collector portion may not contain an active material that is the same as or similar to the active material portion adjacent to the current collector portion in a direction orthogonal to the lamination direction. With such a configuration, it becomes easier to enhance the reaction uniformity in the electrode layer in charging and discharging.

Both the electrode layers of the positive electrode layer and the negative electrode layer may have the current collector portion not containing an active material with respect to the electrode layer. That is, in the positive electrode layer including an edge surface current collecting structure, the current collector portion preferably does not contain a positive electrode active material that is the same as or similar to the positive electrode active material portion adjacent to the current collector portion in a direction orthogonal to the lamination direction, and in the negative electrode layer having an edge surface current collecting structure, the current collector portion may not preferably contain a negative electrode active material that is the same or similar to the negative electrode active material portion adjacent to the current collector portion in a direction orthogonal to the lamination direction. With such a configuration, it becomes further easier to enhance the reaction uniformity in the electrode layer in charging and discharging.

In an embodiment in which the current collector portion does not contain an active material with respect to the electrode layer, the current collector portion may contain an active material with respect to the electrode layer as inevitable impurities. The inevitable impurity is a minor component that can be contained in the raw material of the current collector portion or can be mixed in the production process, and is a component that can be contained to the extent that it does not affect the current collecting characteristics and the charge-discharge reaction of the current collector portion. The inevitable impurity may be contained in the current collector portion in a range of, for example, 5 wt % or less with respect to the total amount of the current collector portion.

In an embodiment, in the sectional view of the solid-state battery laminate, the current collector portion of one electrode layer of the positive electrode layer and the negative electrode layer is not opposed to, that is, does not directly face the active material portion of the other electrode layer (that is, the other electrode layer of the positive electrode layer and the negative electrode layer) adjacent to the one electrode layer with the solid electrolyte interposed therebetween in the lamination direction. That is, the current collector portion of one electrode layer and the active material portion of the other current collector portion do not overlap each other in the lamination direction, or if the current collector portion and the active material portion overlap each other, the degree thereof is as small as possible.

For example, in this embodiment, the expression "not opposed to, that is, does not directly face" indicates that, in the sectional view of the solid-state battery laminate 500', a length dimension L3 in which the positive electrode current collector portion 12A of the positive electrode layer 10A and the negative electrode active material portion 11B of the negative electrode layer 10B adjacent to the positive electrode layer 10A with the solid electrolyte interposed therebetween in the lamination direction overlap each other is 200 μm or less, and the negative electrode current collector portion 12B of the negative electrode layer 10B and the positive electrode active material portion 11A of the positive electrode layer 10A adjacent to the negative electrode layer 10B with the solid electrolyte interposed therebetween do not overlap each other (see FIG. 2).

With such a configuration, a region where the existing portion and the non-existing portion of the electrode active material face each other in the lamination direction can be further reduced. Therefore, it becomes easier to further enhance the reaction uniformity in the electrode layer in charging and discharging.

In an embodiment, in the plan view of the solid-state battery laminate, the current collector portion is interposed between the active material portion and the external terminal (the external terminal having the same polarity as the active material portion) so as to have a larger dimension than the dimension of the active material portion. That is, in the electrode layer having an edge surface current collecting structure, the contact area between the current collector portion and the external terminal may be larger than the contact area between the current collector portion and the active material portion. For example, the current collector portion may be interposed between the active material portion and the external terminal having the same polarity such that the dimension of the electrode layer increases toward the external terminal having the same polarity.

Figure 4B:
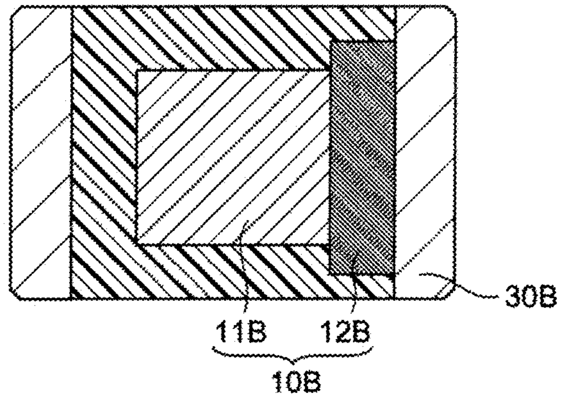
Figure 4C:
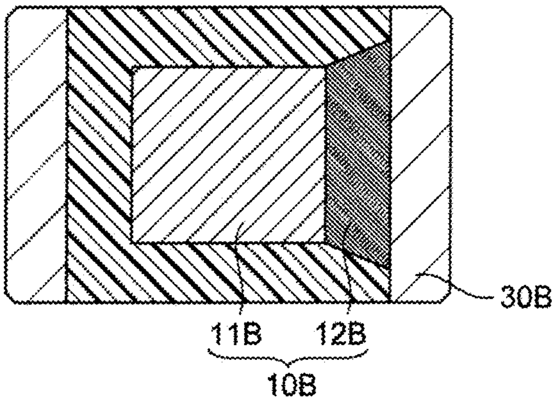

In an exemplary embodiment illustrated in the drawing, in the plan view of the solid-state battery laminate 500', the negative electrode current collector portion 12B is interposed between the negative electrode active material portion 11B and the negative electrode terminal 30B so as to have a larger dimension than the negative electrode active material portion 11B (see FIGS. 4B and 4C) In particular, in the plan view of FIG. 4B, the negative electrode current collector portion 12B extends from the negative electrode active material portion 11B to the negative electrode terminal 30B with a constant dimension. In the plan view of FIG. 4C, the negative electrode current collector portion 12B extends from the negative electrode active material portion 11B to the negative electrode terminal 30B so as to gradually increase in dimension. In other words, the dimension of the negative electrode current collector portion 12B may increase stepwise toward the direction of the negative electrode terminal 30B (see FIG. 4B), or may increase linearly and/or curvilinearly (see FIG. 4C).

With the configuration as described above, the contact area between the negative electrode current collector portion 12B and the negative electrode terminal 30B can be increased. Therefore, the resistance can be reduced, and it becomes easy to further enhance the current collection efficiency.

In an embodiment, in the plan view of the solid-state battery laminate, the current collector portion of the electrode layer also extends to a region other than a region between the active material portion and the external terminal having the same polarity. That is, in the plan view of the solid-state battery laminate, the current collector portion is provided not only on a side most adjacent to the external electrode (a side most adjacent to the external electrode as a whole) among a plurality of sides forming the outer edge of the active material portion, but also on the other side different from the side. For example, in the plan view of the solid-state battery laminate, the current collector portion may be continuously provided to extend over both the most adjacent side of the active material portion and another side continuous to the side. In such an embodiment, it becomes easy to make the electron transfer more uniform, and the current collection efficiency can be further enhanced.

Figure 5A:
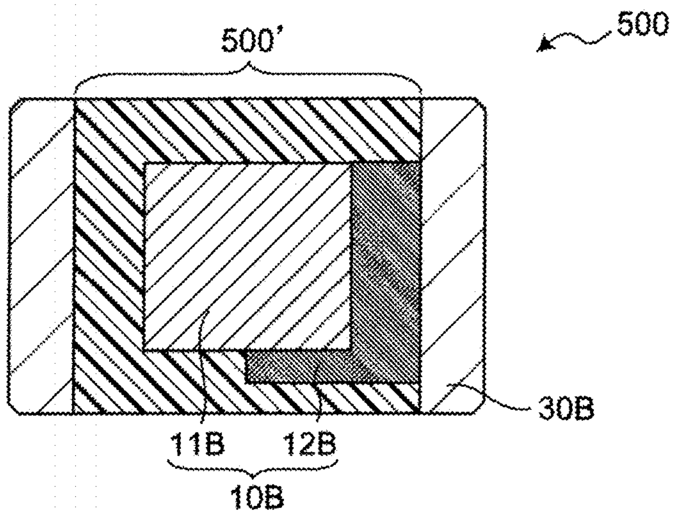
FIGS. 5A to 5C are schematic plan views illustrating another embodiment of the electrode layer in the solid-state battery of the present invention.
Figure 5B:
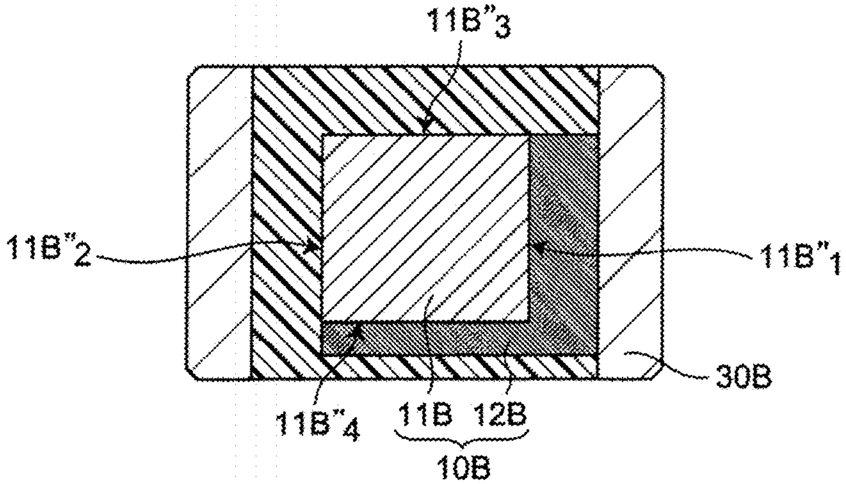
Figure 5C:
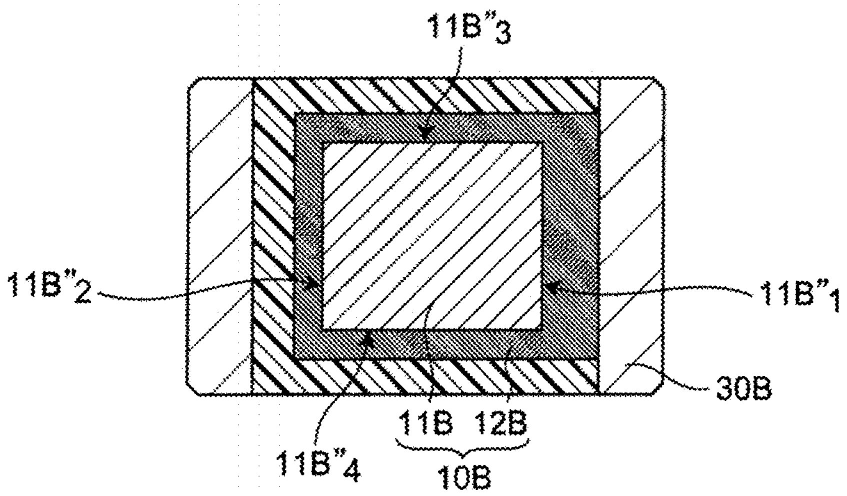

In an exemplary embodiment illustrated in the drawing, in the plan view of the solid-state battery laminate 500', the negative electrode current collector portion 12B of the negative electrode layer 10B also extends to a region other than the region between the negative electrode active material portion 11B and the negative electrode terminal 30B (see FIGS. 5A to 5C). As can be seen from the plan view illustrated in the drawing, the current collector portion may extend to protrude from a region sandwiched between the active material portion and the external terminal.

The negative electrode current collector portion 12B may extend to a portion other than a portion between the negative electrode active material portion 11B and the negative electrode terminal 30B (see FIG. 5A), may extend to surround two sides (that is, edge surfaces $11B''_1$ and $11B''_4$) of the outer edge of the negative electrode active material portion 11B (see FIG. 5B), and may extend to surround the outer edge (that is, edge surfaces $11B''_1$ to $11B''_4$) of the negative electrode active material portion 11B (for example, extend to surround all the edge surfaces) (see FIG. 5C).

With the configuration as described above, a separation distance between the current collector portion and an arbitrary point in the active material portion can be further reduced. This configuration can make the electron transfer more uniform and further enhance the current collection efficiency. When more emphasis is given on the viewpoint of further reducing the separation distance, in the plan view of the solid-state battery laminate, the current collector portion preferably extends to surround the outer edge of the active material portion. That is, in the electrode layer having an edge surface current collecting structure, at least a part or whole of the active material portion may be surrounded by the current collector portion.

In an embodiment, in the plan view of the solid-state battery laminate, the current collector portion extends to a side surface on which the external terminal of the solid-state battery laminate is not provided. That is, among the plurality of side surfaces of the solid-state battery laminate, not only the current collector portion is provided to extend to an installation side surface of the external terminal, but also the current collector portion is provided on a side surface different from the installation side surface. For example, the current collector portion is continuously provided to extend to both the installation side surface of the external terminal and another side surface of the solid-state battery laminate continuous with the side surface. By providing the current collector portion over a wide range as described above, it becomes easy to reduce the resistance of the solid-state battery, and the current collection efficiency can be further enhanced.

Figure 6A:
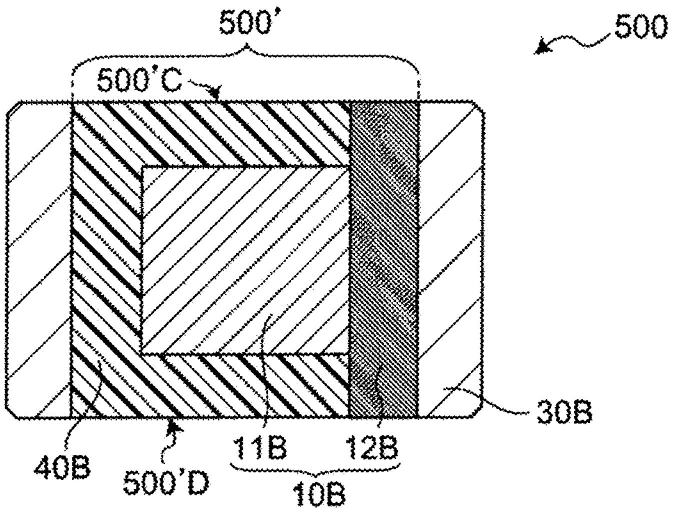
FIGS. 6A to 6C are schematic plan views illustrating still another embodiment of the electrode layer in the solid-state battery of the present invention.
Figure 6B:
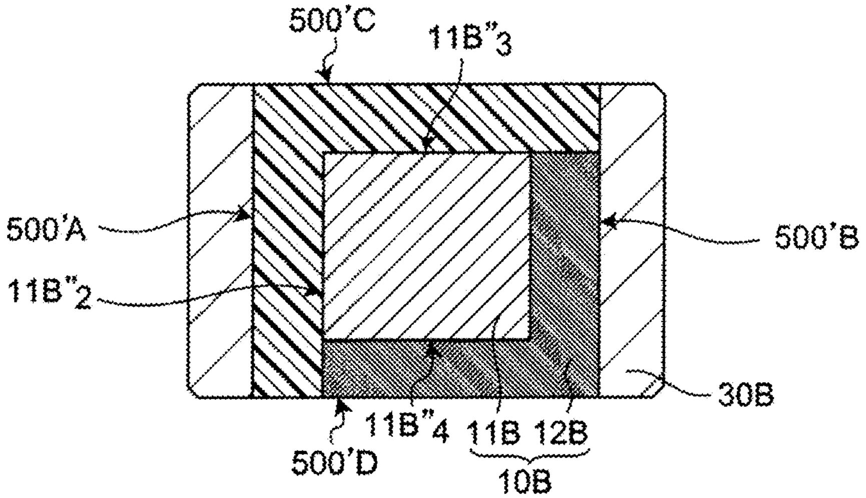
Figure 6C:
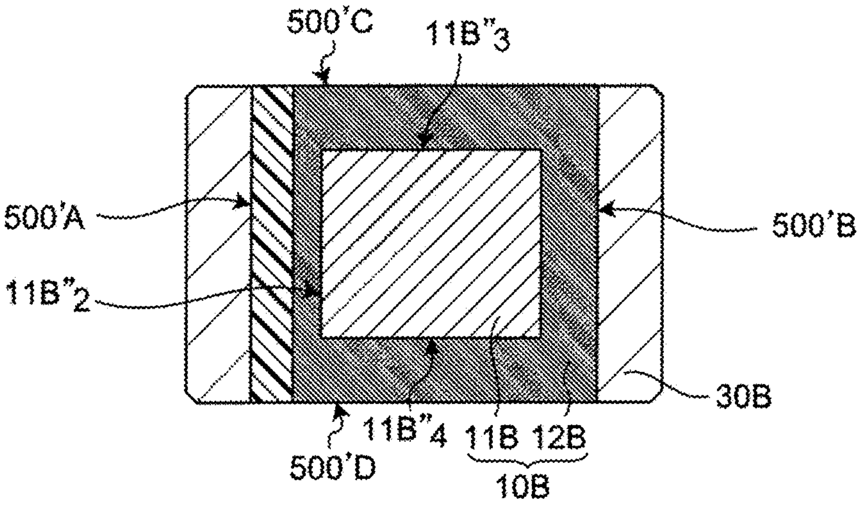

In an exemplary embodiment illustrated in the drawing, in the plan view of the solid-state battery laminate 500', the negative electrode current collector portion 12B of the negative electrode layer 10B extends to a side surface on which the external terminal of the solid-state battery laminate 500' is not provided (that is, the non-electrode-side edge surface 500'C and/or 500'D) (see FIGS. 6A to 6C). As can be seen from such an exemplary embodiment, the expression "extend to a side surface" substantially means that the current collector portion extends to reach the outer edge portion of the solid-state battery laminate forming the side surface or the edge surface of the solid-state battery.

The negative electrode current collector portion 12B may extend widely to the edge surfaces 500'C and 500'D to fill between the negative electrode active material portion 11B and the negative electrode terminal 30B (see FIG. 6A, may extend to the edge surface 500'D to surround two sides of the outer edge of the negative electrode active material portion 11B (see FIG. 6B), and may extend to the edge surfaces 500'C and 500'D to surround the outer edge of the negative electrode active material portion 11B (for example, to surround all the outer edge) (see FIG. 6C).

When the negative electrode current collector portion 12B extends to the side surface (that is, the non-electrode-side edge surface 500'C and/or 500'D) on which the external terminal is not provided, an electrode extraction portion in which the external terminal is further provided also to the side surface can be formed. Therefore, the contact area between the current collecting portion and the external terminal can be increased. Therefore, it becomes easy to reduce the resistance, and the current collection efficiency can be further enhanced.

In an embodiment, in the sectional view of the solid-state battery laminate, the contact surface between the active material portion and the current collector portion forms an inclined surface. The expression "forming an inclined surface" indicates the shape in which the separation distance between the "contact surface between the active material portion and the current collector portion" and the inner edge surface of the external terminal gradually changes along the lamination direction in the sectional view of the solid-state battery laminate. That is, in the sectional view of the solid-state battery laminate, the contact surface between the active material portion and the current collector portion does not have a parallel relation with the side surface of the solid-state battery laminate, and has a non-parallel relation with the side surface. In the sectional view of the solid-state battery laminate, the solid-state battery laminate may include at least a portion in which the plane direction of the contact surface between the active material portion and the current collector portion forms an angle with the lamination direction. In such an embodiment, the contact area between the active material portion and the current collector portion can be further increased.

In an exemplary embodiment illustrated in the drawing, in the sectional view of the solid-state battery laminate, a contact surface 13 between the negative electrode active material portion 11B and the negative electrode current collector portion 12B forms an inclined surface (see FIGS. 7A to 7I), and a larger contact area between the negative electrode active material portion 11B and the negative electrode current collector portion 12B is obtained. Thus, it becomes easy to make the electron transfer more uniform, and the current collection efficiency can be further enhanced.

Figure 7A:
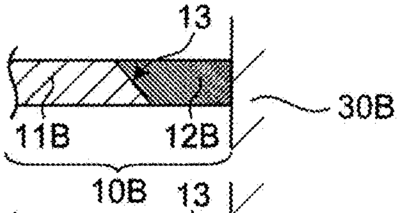
FIGS. 7A to 7I are schematic sectional views illustrating an embodiment of the electrode layer in the solid-state battery of the present invention.
Figure 7B:
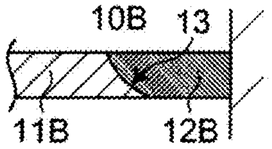
Figure 7C:
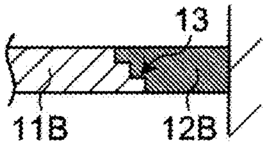
Figure 7D:
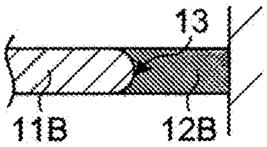
Figure 7E:
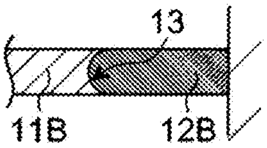
Figure 7F:
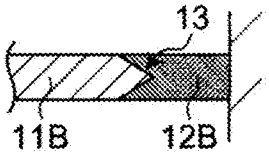
Figure 7G:
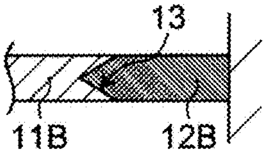
Figure 7H:
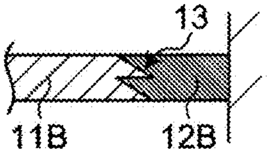

As a specific shape in sectional view, the negative electrode active material portion 11B may linearly form the contact surface 13 so that the thickness dimension gradually decreases toward the negative electrode current collector portion 12B (see FIG. 7A), may curvilinearly form the contact surface 13 (see FIG. 7B), may form the contact surface 13 so that the thickness dimension changes to a step shape (see FIG. 7C), or may form the contact surface 13 in a semicircular shape (see FIGS. 7D and 7E).

In the portion forming the same inclined surface, the linear shape and the curved shape may be combined with each other. That is, the contact surface 13 preferably has an inclined surface in a curved shape. Thereby, it becomes easy to particularly increase the contact area between the negative electrode active material portion 11B and the negative electrode current collector portion 12B.

The shape of the contact surface in sectional view may be subdivided to have two inclined surfaces. For example. the negative electrode active material portion 11B may be subdivided to have inclined surfaces on the both sides of the lamination direction (see FIG. 7D to 7G), and may be subdivided to have two inclined surfaces in the same direction in the lamination direction (see FIG. 7H).

In an embodiment, in the sectional view of the solid-state battery laminate, the current collector portion extends to reach the main surface of the active material portion. That is, in the electrode layer having an edge surface current collecting structure, not only the current collector portion is provided to be in contact with the side surface of the active material portion, but also the current collector portion is continuously provided to reach a part of the main surface of the active material portion. In particular, in the sectional view of the solid-state battery laminate, the current collector portion may be provided over a wider area to straddle both the side surface and the main surface of the active material portion. Also in such an embodiment, the contact area between the active material portion and the current collector portion can be further increased.

Figure 7I:
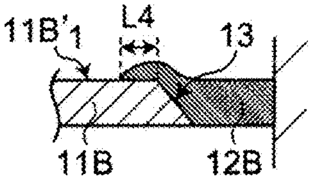

In an embodiment illustrated in the drawing, in the negative electrode layer 10B, the negative electrode current collector portion 12B extends to reach a part of the main surface (for example, the main surface 11B'$_1$) of the negative electrode active material portion 11B (see FIG. 7I). With such a configuration, it becomes easy to particularly increase the contact area between the negative electrode active material portion 11B and the negative electrode current collector portion 12B. As illustrated in FIG. 7I, in the sectional view of the solid-state battery laminate, the current collector portion may extend to reach a part of the main surface of the active material portion (particularly, a peripheral edge portion thereof) while forming an inclined surface by the contact surface between the active material portion and the current collector portion. A length dimension (L4) in the horizontal direction with respect to the lamination direction in which the current collector portion extends to reach the main surface of the active material portion is preferably 200 μm or less.

Figure 8:
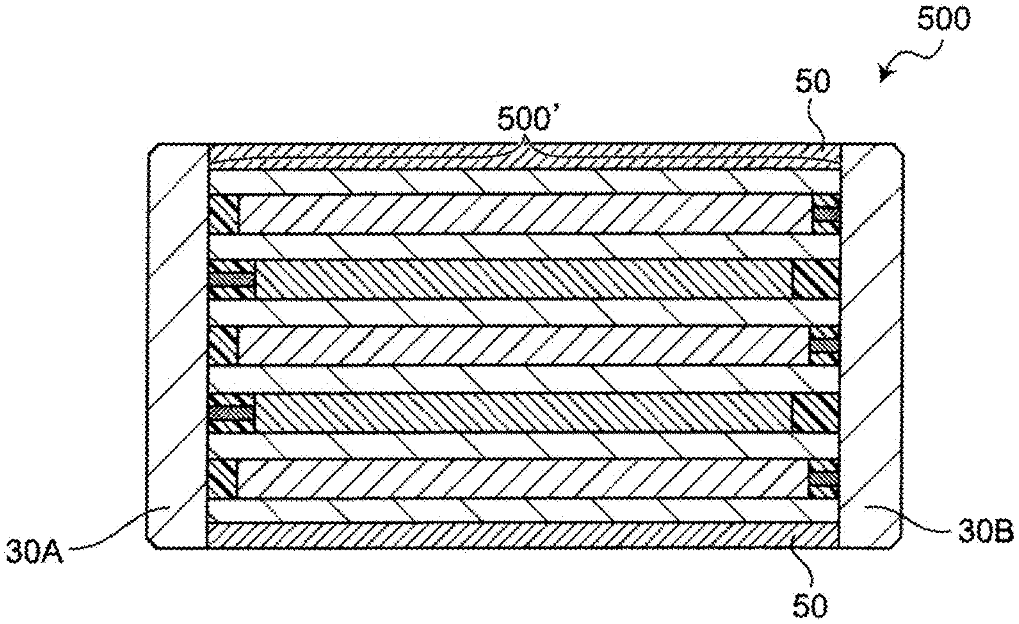
FIG. 8 is a schematic sectional view illustrating the solid-state battery including a protective layer according to an embodiment of the present invention.

In an embodiment, the solid-state battery may further include a protective layer. In an exemplary embodiment illustrated in FIG. 8, a protective layer 50 may be provided to cover the solid-state battery laminate 500'. The protective layer (not illustrated) may be provided outside the solid-state battery laminate 500', the positive electrode terminal 30A, and the negative electrode terminal 30B so as to be integrated therewith.

The structure in the solid-state battery described herein may be a structure in which a section in a sectional view direction or a section in a plan view direction is cut out by an ion milling apparatus (Model No.: IM4000PLUS manufactured by Hitachi High-Tech Corporation) and observed from an image acquired using a scanning electron microscope (SEM) (Model No.: SU-8040 manufactured by Hitachi High-Tech Corporation). Various dimensions described herein may refer to values calculated from dimensions measured from an image acquired by the above-described method.

The active material densities of the active material portion and the current collector portion described herein may refer to values obtained according to the following procedure.

(1) A section (for example, a section illustrated in FIG. 2) in a sectional view direction of an active material portion and a current collector portion in one electrode layer is cut out by an ion milling apparatus.

(2) With respect to the section obtained in the above (1), an SEM image is acquired at a magnification at which the center portion in the width direction of the active material portion in the electrode layer is regarded as a measurement center and the entire portion falls within the visual field. Similarly, an SEM image is acquired at a magnification at which the center portion in the width direction of the current collector portion in the same electrode layer as described above is regarded as a measurement center and the entire portion falls within the visual field.

(3) With respect to the section obtained in the above (1), SEM images of a total of three points are acquired at a magnification of 1000 times with the center portion of each regions divided into three equal parts with respect to the width direction of the active material portion in the electrode layer being regarded as a measurement center. The acquired SEM images are binarized, for example, to measure the average value of the active material ratios of the active material portions obtained from the three SEM images. Similarly, SEM images of a total of three points are acquired at a magnification of 1000 times with the center portion of each regions divided into three equal parts with respect to the width direction of the current collector portion in the same electrode layer as described above being regarded as a measurement center. The acquired SEM images are binarized, for example, to measure the average value of the active material ratios of the current collector portions obtained from the three SEM images.

(4) From each image acquired in the above (2), the sectional area of the active material portion is measured and multiplied by the average value of the active material ratio of the active material portion to calculate the amount of distribution of the active material in the active material portion. Similarly, from each image acquired in the above (2), the sectional area of the current collector portion is measured and multiplied by the average value of the active material ratio of the current collector portion to calculate the amount of distribution of the active material in the current collector portion.

(5) From each image acquired in the above (2), the sectional areas of the active material portion and the current collector portion are respectively measured, and the sectional area of the electrode layer (that is, the sum of the sectional areas of the active material portion and the current collector portion) is calculated. The active material densities of each of the active material portion and the current collector portion are respectively calculated by dividing the amount of the obtained active material distributed by the area of the electrode layer.

[Method for Producing Solid-State Battery]

As described above, the solid-state battery of the present invention can be produced by a printing method such as a screen printing method, a green sheet method using a green sheet, or a composite method thereof. Hereinafter, a case where a printing method and a green sheet method are adopted for understanding the present invention will be described in detail, but the present invention is not limited to these methods.

(Step of Forming Solid-State Battery Laminate Precursor)

In this step, several types of pastes such as a positive electrode active material portion paste, a negative electrode active material portion paste, a solid electrolyte layer paste, a current collector portion paste, an electrode separation portion paste, and a protective layer paste are used as the ink. That is, a paste having a predetermined structure is formed on a support substrate by applying the paste by a printing method.

In printing, a solid-state battery laminate precursor corresponding to a predetermined solid-state battery structure can be formed on a substrate by sequentially laminating printing layers with a predetermined thickness and pattern shape. The kind of the pattern forming method is not particularly limited as long as it is a method capable of forming a predetermined pattern, and is, for example, any one or two or more kinds of a screen printing method, a gravure printing method, and the like.

The paste can be prepared by wet-mixing a predetermined constituent material of each layer appropriately selected from the group consisting of a positive electrode active material, a negative electrode active material, a conductive material, a solid electrolyte, an insulating material, a binder, and a sintering aid with an organic vehicle in which an organic material is dissolved in a solvent. The positive electrode active material portion paste may contain, for example, a positive electrode active material, a conductive material, a solid electrolyte, a binder, a sintering aid, and organic material, and a solvent. The negative electrode active material portion paste may contain, for example, a negative electrode active material, a conductive material, a solid electrolyte, a binder, a sintering aid, and organic material, and a solvent. The solid electrolyte layer paste may contain, for example, a solid electrolyte, a binder, a sintering aid, an organic material, and a solvent. The positive electrode current collector portion paste and the negative electrode current collector portion paste may contain a conductive material, an active material, a solid electrolyte, a binder, a sintering aid, an organic material, and a solvent. The electrode separation portion paste may contain, for example, a solid electrolyte, an insulating material, a binder, a sintering aid, an organic material, and a solvent. The protective layer paste may contain, for example, an insulating material, a binder, an organic material, and a solvent.

The organic material contained in the paste is not particularly limited, but at least one polymer material selected from the group consisting of a polyvinyl acetal resin, a cellulose resin, a polyacrylic resin, a polyurethane resin, a polyvinyl acetate resin, a polyvinyl alcohol resin, and the like can be used. The kind of the solvent is not particularly limited, and is, for example, any one or two or more kinds among organic solvents such as butyl acetate, N-methyl-pyrrolidone, toluene, terpineol, and N-methyl-pyrrolidone.

In the wet mixing, a medium can be used, and specifically, a ball mill method, a viscomill method, or the like can be used. On the other hand, a wet mixing method without using a medium may be used, and a sand mill method, a high-pressure homogenizer method, a kneader dispersion method, or the like can be used.

The support substrate is not particularly limited as long as it is a support capable of supporting each paste layer, and is, for example, a release film having one surface subjected to a release treatment. Specifically, a substrate made of a polymer material such as polyethylene terephthalate can be used. When each paste layer is subjected to the firing step while being held on the substrate, a substrate having heat resistance to a firing temperature may be used as the substrate.

The applied paste is dried on a heated hot plate to respectively form a positive electrode layer green sheet, a negative electrode layer green sheet, a solid electrolyte layer green sheet, an electrode separation green sheet, and/or a protective layer green sheet, and the like each having a predetermined shape and thickness on a substrate (for example, a PET film).

Next, each green sheet is peeled off from the substrate. After peeling, the green sheets for the respective constituent elements of one of the battery constituent units are sequentially laminated along the lamination direction to form a solid-state battery laminate precursor. After lamination, the solid electrolyte layer, the electrode separation portion, and/or the protective layer, and the like may be provided in a side region of the electrode green sheet by screen printing.

(Firing Step)

In the firing step, the solid-state battery laminate precursor is subjected to firing. Although it is merely an example, the firing is performed by heating in a nitrogen gas atmosphere containing oxygen gas or in the atmosphere. The firing may be performed while pressurizing the solid-state battery laminate precursor in the lamination direction (in some cases, the lamination direction and a direction perpendicular to the lamination direction).

Through such firing, a solid-state battery laminate is formed, and a desired solid-state battery is finally obtained.

(Preparation of Characteristic Part in Present Invention)

In the electrode layer of the solid-state battery according to the present invention, the electrode layer may be formed by any method as long as the electrode layer has a structure in which a current collector portion is provided on the edge surface of the active material portion. For example, a layer may be formed so that the active material portion and the current collector portion are juxtaposed and in contact with each other in the electrode layer in a direction orthogonal to the lamination direction.

For example, printed layers of a plurality of raw material pastes may be sequentially laminated with a predetermined thickness and pattern shape, and an electrode layer green sheet may be prepared so that a precursor of the active material portion (hereinafter, also simply referred to as "active material portion") and a precursor of the current collector portion (hereinafter, also simply referred to as "current collector portion") are juxtaposed and in contact with each other in a direction orthogonal to the lamination direction. Specifically, a predetermined electrode layer green sheet may be prepared by adjusting the active material amount and/or the number of times of application of the raw material paste in each printing layer to be laminated.

In the electrode layer of the solid-state battery according to the present invention, in the shape in which the contact surface between the active material portion and the current collector portion forms an inclined surface, for example, an inclined surface may be formed such that the thickness dimension of the active material portion decreases toward the current collector portion, and the current collector portion may be formed to fill the inclined surface.

As an example, in a screen printing method, an active material portion may be formed using a screen plate in which a mesh diameter decreases toward an end portion of the active material portion in contact with the current collector portion with respect to a mesh diameter of the screen plate applied to the central portion of the active material portion.

In the printing method, the viscosity of the active material portion paste may be adjusted so that the film thickness becomes thinner toward the end portion of the active material portion in contact with the current collector portion (for example, the paste may be adjusted to have a low viscosity so that application end is slanted).

Figure 9A:
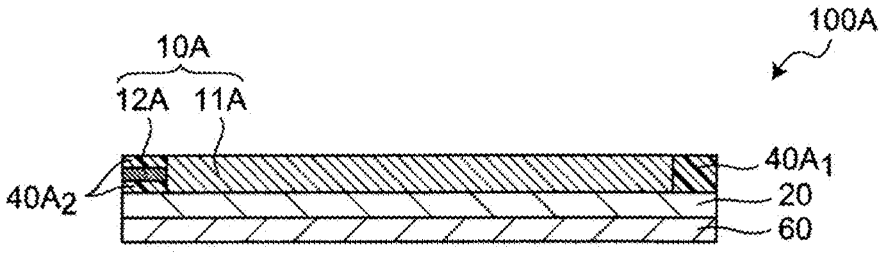
FIGS. 9A to 9C are schematic sectional views for describing a method for producing a solid-state battery according to an embodiment of the present invention.

Hereinafter, the method for producing a solid-state battery will be specifically described on the basis of exemplary embodiments illustrated in FIGS. 9A to 9C.

In order to produce a solid-state battery, for example, as described below, a step of forming a positive electrode green sheet 100A, a step of forming a negative electrode green sheet 100B, a step of forming the solid-state battery laminate 500', and a step of forming each of the positive electrode terminal 30A and the negative electrode terminal 30B are performed.

[Step of Forming Positive Electrode Green Sheet]

First, a solid electrolyte layer paste is prepared by mixing a solid electrolyte, a solvent, and as necessary, a binder or the like. Subsequently, as illustrated in FIG. 9A, the solid electrolyte layer paste is applied to one surface of the substrate 60 to form a solid electrolyte green sheet 20 (hereinafter, also simply referred to as "solid electrolyte layer").

An electrode separation portion paste is prepared by mixing an insulating material, a solvent, and as necessary, a binder or the like. The electrode separation portion paste is applied to both end portions of the surface of the solid electrolyte layer 20 using a pattern forming method to form two positive electrode separation portions 40$A_1$ and 40$A_2$. At this time, the positive electrode separation portion 40$A_2$ is formed to be thinner than the positive electrode separation portion 40$A_1$.

A positive electrode active material portion paste is prepared by mixing a positive electrode active material, a solvent, and as necessary, a binder or the like. The positive electrode active material portion paste is applied to the surface of the solid electrolyte layer 20 using a pattern forming method to form the positive electrode active material portion 11A.

A positive electrode current collector portion paste is prepared by mixing a conductive material, a solvent, and a binder or the like. The current collector portion paste is applied to the surface of the positive electrode separation portion 40$A_2$ using a pattern forming method to form the positive electrode current collector portion 12A. At this time, the surface portion of the positive electrode current collector portion 12A is thinly applied to form the positive electrode current collector portion 12A such that the end portion becomes a recessed portion.

Finally, the electrode separation portion paste is applied to the recessed portion on the surface of the positive electrode current collector portion 12A to form the positive electrode separation portion 40$A_2$. Thereby, the positive electrode green sheet 100A which includes the positive electrode layer 10A including the positive electrode active material portion 11A and the positive electrode current collector portion 12A, the solid electrolyte layer 20, and the positive electrode separation portion 40A is obtained.

[Step of Forming Negative Electrode Green Sheet]

Figure 9B:
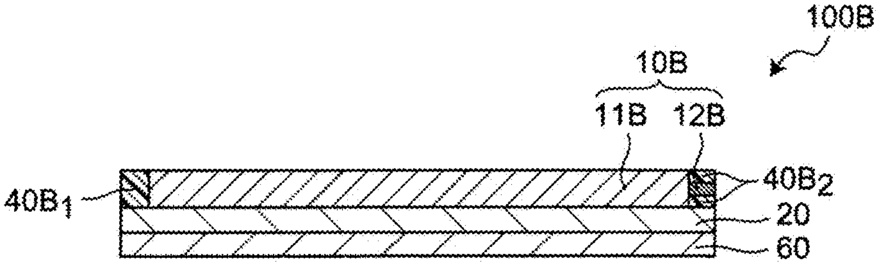
Figure 9C:
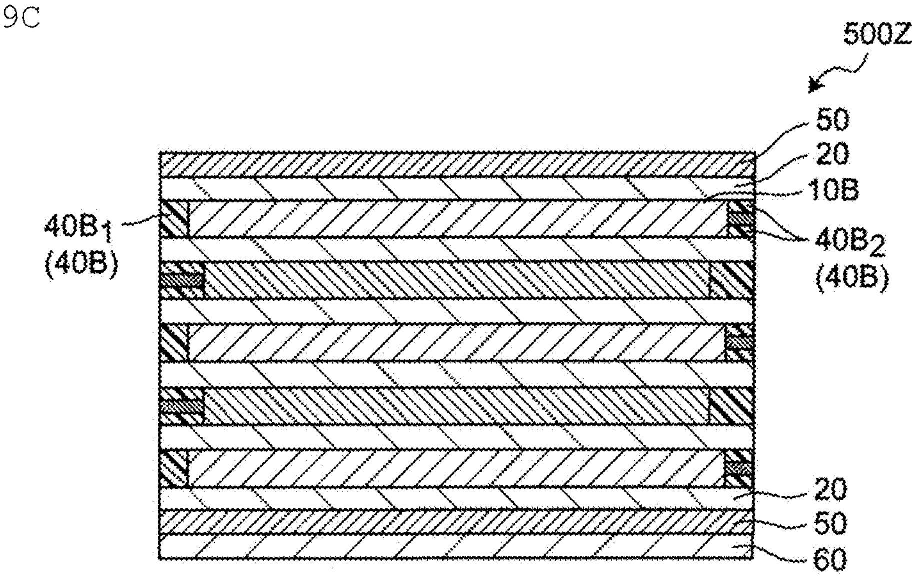

First, as illustrated in FIG. 9B, the solid electrolyte layer 20 is formed on one surface of the substrate 60 by the above-described procedure.

The electrode separation portion paste is prepared by the same procedure as the procedure of preparing an electrode separation portion paste described above. The electrode separation portion paste is applied to both end portions of the surface of the solid electrolyte layer 20 using a pattern forming method to form two negative electrode separation portions 40$B_1$ and 40$B_2$. At this time, the negative electrode separation portion 40$B_2$ is formed to be thinner than the negative electrode separation portion 40$B_1$.

A negative electrode active material portion paste is prepared by mixing a negative electrode active material, a solvent, and as necessary, a binder or the like. The negative electrode active material portion paste is applied to the surface of the solid electrolyte layer 20 using a pattern forming method to form the negative electrode active material portion 11B.

A negative electrode current collector portion paste is prepared by mixing a conductive material, a solvent, and a binder or the like. The negative electrode current collector portion paste is applied to the surface of the negative electrode separation portion 40$B_2$ using a pattern forming method to form the negative electrode current collector portion 12B. At this time, the surface portion of the negative electrode current collector portion 12B is thinly applied to form the negative electrode current collector portion 12B such that the end portion becomes a recessed portion.

Finally, the electrode separation portion paste is applied to the recessed portion on the surface of the negative electrode current collector portion 12B to form the negative electrode separation portion 40$B_2$. Thereby, the negative electrode green sheet 100B which includes the negative electrode layer 10B including the negative electrode active material portion 11B and the negative electrode current collector portion 12B, the solid electrolyte layer 20, and the negative electrode separation portion 40B is obtained.

[Step of Forming Solid-State Battery Laminate]

First, a protective layer paste is prepared by mixing an insulating material, a solvent, and as necessary, a binder or the like. As illustrated in FIG. 9C, the protective layer paste is applied to one surface of the substrate 60 to form the protective layer 50.

The positive electrode green sheet 100A and the negative electrode green sheet 100B peeled off from the substrate 60 are alternately laminated on the surface of the protective layer 50. Here, for example, two positive electrode green sheets 100A and three negative electrode green sheets 100B are alternately laminated. More specifically, the green sheets 100B, 100A, 100B, 100A, and 100B are laminated in this order.

After the solid electrolyte layer 20 is formed on the surfaces of the negative electrode layer 10B and the negative electrode separation portion 40B by the same procedure as the procedure of forming the solid electrolyte layer 20, the protective layer 50 is formed on the surface of the solid electrolyte layer 20 by the same procedure as the procedure of forming the protective layer 50. Next, the substrate 60 on the lowermost layer is peeled off to form a solid-state battery laminate precursor 500Z.

Finally, the solid-state battery laminate precursor 500Z is heated. In this case, the heating temperature is set so that a series of layers constituting the solid-state battery laminate precursor 500Z is sintered. Other conditions such as a heating time can be arbitrarily set.

By this heating treatment, a series of layers constituting the solid-state battery laminate precursor 500Z is sintered, so that the series of layers is thermocompression bonded. Thus, the solid-state battery laminate 500' is formed.

[Step of Forming Each of Positive Electrode Terminal and Negative Electrode Terminal]

The positive electrode terminal is bonded to the solid-state battery laminate, for example, using a conductive adhesive, and the negative electrode terminal is bonded to the solid-state battery laminate, for example, using a conductive adhesive. Thereby, each of the positive electrode terminal and the negative electrode terminal is attached to the solid-state battery laminate, so that a solid-state battery is completed.

Although the embodiments of the present invention have been hereinbefore described, they are merely the typical embodiments. It will be readily appreciated by those skilled in the art that the present invention is not limited to the above embodiments, and that various modifications are possible without departing from the scope of the present invention.

The solid-state battery of the present invention can be used in various fields where battery use or power storage is assumed. Although being merely an example, the solid-state battery of the present invention can be used in the electronics packaging field. The solid-state battery of the present invention can also be used in electric, information, and communication fields using mobile devices and the like (for example, electric and electronic device fields or mobile device fields including mobile phones, smartphones, notebook computers and digital cameras, activity meters, arm computers, electronic paper, wearable devices, and the like, and small-sized electronic devices such as RFID tags, card-type electronic money, and smartwatches), home and small industrial applications (for example, fields of electric tools, golf carts, and home, nursing, and industrial robots), large industrial applications (for example, fields of forklifts, elevators, and harbor cranes), transportation system fields (for example, fields of hybrid vehicles, electric vehicles, buses, trains, power-assisted bicycles, electric two-wheeled vehicles, and the like), power system applications (for example, fields of various types of power generation, road conditioners, smart grids, household power storage systems, and the like), medical applications (fields of medical device such as earphone hearing aids), pharmaceutical applications (fields of dosage management systems and the like), IoT fields, space and deep sea applications (for example, fields of spacecrafts, submersible research vehicles, and the like), and the like.

DESCRIPTION OF REFERENCE SYMBOLS

10: Electrode layer
10A: Positive electrode layer
11A: Positive electrode active material portion
11A': Main surface of positive electrode active material portion
11A": Edge surface of positive electrode active material portion
12A: Positive electrode current collector portion
12A": Edge surface of positive electrode current collector portion
10B: Negative electrode layer
11B: Negative electrode active material portion
11B': Main surface of negative electrode active material portion
11B": Edge surface of negative electrode active material portion
12B: Negative electrode current collector portion
12B": Edge surface of negative electrode current collector portion
13: Contact surface between active material portion and current collector portion
20: Solid electrolyte layer
30: Terminal
30A: Positive electrode terminal
30B: Negative electrode terminal
40: Electrode separation portion
40A: Positive electrode separation portion
40B: Negative electrode separation portion
50: Protective layer
60: Substrate
100: Green sheet
100A: Positive electrode green sheet
100B: Negative electrode green sheet
500Z: Solid-state battery laminate precursor
500': Solid-state battery laminate
500'A: Positive-electrode-side edge surface
500'B: Negative-electrode-side edge surface
500'C, D: Non-electrode-side edge surface
500: Solid-state battery

The invention claimed is:

1. A solid-state battery, comprising:

a solid-state battery laminate in which a positive electrode layer, a negative electrode layer, and a solid electrolyte layer are laminated with the solid electrolyte layer interposed between the positive electrode layer and the negative electrode layer;

a positive electrode external terminal on a first side surface of the solid-state battery laminate and electrically connected to the positive electrode layer; and a negative electrode external terminal on a second side surface of the solid-state battery laminate and electrically connected to the negative electrode layer, wherein the positive electrode layer and the negative electrode layer each include:

an active material portion containing an active material; and a current collector portion having a smaller active material density than the active material portion and arranged on an edge surface of the active material portion and extending in a direction orthogonal to a lamination direction of the solid-state battery laminate so as to form an edge surface current collecting structure in which a current can be collected using the current collector portion on the edge surface of the active material portion, wherein, in the positive electrode layer, a ratio of a length of an entirety of the current collector portion to an entire length of the positive electrode layer is 0.01 to 0.5, and wherein, in the negative electrode layer, the ratio of the length of the entirety of the current collector portion to an entire length of the negative electrode layer is 0.01 to 0.5, and wherein, in at least one of the positive electrode layer and the negative electrode layer, the active material portion does not include a current collector layer or a current collecting layer inside the active material portion and a main surface thereof.

2. The solid-state battery according to claim 1, wherein in the positive electrode layer, the current collector portion is interposed between the active material portion and the positive electrode external terminal such that the current collector portion is in contact with the active material portion and with the positive electrode external terminal, and in the negative electrode layer, the current collector portion is interposed between the active material portion and the negative electrode external terminal such that the current collector portion is in contact with the active material portion and with the negative electrode external terminal.

3. The solid-state battery according to claim 1, wherein the active material portion of at least one of the positive electrode layer and the negative electrode layer does not contain a conductive layer inside the active material portion and on a main surface of the active material portion.

4. The solid-state battery according to claim 1, wherein the current collector portion of at least one of the positive electrode layer and the negative electrode layer does not contain the active material.

5. The solid-state battery according to claim 1, wherein the current collector portion of both the positive electrode layer and the negative electrode layer does not contain the active material.

6. The solid-state battery according to claim 1, wherein, in a sectional view of the solid-state battery laminate, the current collector portion of one of the positive electrode layer and the negative electrode layer is not opposed to the active material portion of the other of the positive electrode layer and the negative electrode layer in the lamination direction.

7. The solid-state battery according to claim 1, wherein, in a sectional view of the solid-state battery laminate, the active material portion and the current collector portion of at least one of the positive electrode layer and the negative electrode layer are flush with each other.

8. The solid-state battery according to claim 1, wherein, in a plan view of the solid-state battery laminate and in at least one of the positive electrode layer and the negative electrode layer, the current collector portion has a larger dimension than the active material portion, and the current collector portion is interposed between the active material portion and the external terminal.

9. The solid-state battery according to claim 1, wherein, in a plan view of the solid-state battery laminate, in the positive electrode layer, the current collector portion extends to a region other than a region between the active material portion and the positive electrode external terminal, and in the negative electrode layer, the current collector portion extends to a region other than a region between the active material portion and the negative electrode external terminal.

10. The solid-state battery according to claim 9, wherein, in the plan view of the solid-state battery laminate, the current collector portion of at least one of the positive electrode layer and the negative electrode layer surrounds an outer edge of the active material portion.

11. The solid-state battery according to claim 1, wherein, in a plan view of the solid-state battery laminate, the current collector portion of at least one of the positive electrode layer and the negative electrode layer extends to a side surface of the solid-state battery laminate on which the positive electrode external terminal and the negative electrode external terminal are not located.

12. The solid-state battery according to claim 1, wherein, in a sectional view of the solid-state battery laminate, a contact surface between the active material portion and the current collector portion of at least one of the positive electrode layer and the negative electrode layer is an inclined surface.

13. The solid-state battery according to claim 1, wherein, in a sectional view of the solid-state battery laminate, the current collector portion extends to a main surface of the active material portion in at least one of the positive electrode layer and the negative electrode layer.

14. The solid-state battery according to claim 1, wherein the positive electrode layer and the negative electrode layer are layers capable of occluding and releasing lithium ions.

15. The solid-state battery according to claim 1, wherein a content of the active material in the active material portion of at least one of the positive electrode layer and the negative electrode layer is 50 wt % or more.

16. The solid-state battery according to claim 15, wherein a content of the active material in the current collector portion of at least one of the positive electrode layer and the negative electrode layer is 90 wt % or less.

17. The solid-state battery according to claim 1, wherein a content of the active material in the current collector portion of at least one of the positive electrode layer and the negative electrode layer is 90 wt % or less.

18. The solid-state battery according to claim 1, wherein a surface where the positive electrode external terminal and the current collector portion of the positive electrode layer are in contact with each other, and a surface where the current collector portion of the positive electrode layer is in contact with the active material portion of the positive electrode layer are arranged so as to face each other.

19. The solid-state battery according to claim 1, wherein the active material portion of at least one of the positive electrode layer and the negative electrode layer does not include the current collector portion of the at least one of the positive electrode layer and the negative electrode layer, respectively.

* * * * *